(12) United States Patent
Jain

(10) Patent No.: US 9,287,580 B2
(45) Date of Patent: Mar. 15, 2016

(54) BATTERY WITH AUXILIARY ELECTRODE

(75) Inventor: Gaurav Jain, Edina, MN (US)

(73) Assignee: MEDTRONIC, INC., Minneapolis, MN (US)

( * ) Notice: Subject to any disclaimer, the term of this patent is extended or adjusted under 35 U.S.C. 154(b) by 1199 days.

(21) Appl. No.: 13/192,264

(22) Filed: Jul. 27, 2011

(65) Prior Publication Data
US 2013/0029207 A1   Jan. 31, 2013

(51) Int. Cl.
| | |
|---|---|
| *H01M 4/13* | (2010.01) |
| *H01M 10/052* | (2010.01) |
| *H01M 4/06* | (2006.01) |
| *H01M 10/42* | (2006.01) |
| *H01M 10/44* | (2006.01) |

(52) U.S. Cl.
CPC .............. *H01M 10/052* (2013.01); *H01M 4/06* (2013.01); *H01M 10/4235* (2013.01); *H01M 10/44* (2013.01); *Y02E 60/122* (2013.01); *Y10T 29/49108* (2015.01)

(58) Field of Classification Search
CPC ....................................................... H01M 4/13
See application file for complete search history.

(56) References Cited

U.S. PATENT DOCUMENTS

| | | |
|---|---|---|
| 3,308,306 A | 3/1967 | Bagno |
| 3,462,303 A | 8/1969 | Reber |
| 3,791,867 A | 2/1974 | Broadhead et al. |
| 3,864,167 A | 2/1975 | Broadhead et al. |
| 3,898,096 A | 8/1975 | Heredy et al. |
| 4,009,052 A | 2/1977 | Whittingham |
| 4,048,397 A | 9/1977 | Rothbauer |
| 4,049,887 A | 9/1977 | Whittingham |
| 4,113,921 A | 9/1978 | Goldstein et al. |
| 4,194,062 A | 3/1980 | Carides et al. |
| 4,202,702 A | 5/1980 | Nuss |
| 4,340,652 A | 7/1982 | Raistrick et al. |
| 4,446,212 A | 5/1984 | Kaun |
| 4,464,447 A | 8/1984 | Lazzari et al. |
| 4,507,371 A | 3/1985 | Thackeray et al. |
| 4,547,442 A | 10/1985 | Besenhard et al. |
| 4,555,456 A | 11/1985 | Kanehori et al. |
| 4,581,122 A | 4/1986 | Hammond et al. |
| 4,668,595 A | 5/1987 | Yoshino et al. |
| 4,764,437 A | 8/1988 | Kaun |
| 4,830,939 A | 5/1989 | Lee et al. |

(Continued)

FOREIGN PATENT DOCUMENTS

| | | |
|---|---|---|
| DE | 19836651 A1 | 2/2000 |
| EP | 0 732 761 A2 | 9/1996 |

(Continued)

OTHER PUBLICATIONS

U.S. Appl. No. 13/231,408, filed Sep. 13, 2011, Howard et al.

(Continued)

*Primary Examiner* — Jacob Marks

(57) ABSTRACT

A lithium-ion battery includes a case, an electrolyte, a positive electrode, a negative electrode, and an auxiliary electrode. The positive electrode includes a current collector and an active material. The negative electrode includes a current collector and an active material. The auxiliary electrode includes an active material. The electrolyte, positive electrode, and negative electrode are disposed within the case. The auxiliary electrode is configured to selectively couple to the negative electrode to irreversibly absorb lithium from the negative electrode.

18 Claims, 8 Drawing Sheets

(56) References Cited

U.S. PATENT DOCUMENTS

| | | |
|---|---|---|
| 4,873,158 A | 10/1989 | Chang et al. |
| H723 H | 1/1990 | Plichta et al. |
| 5,053,297 A | 10/1991 | Yamahira et al. |
| 5,077,151 A | 12/1991 | Yasuda et al. |
| 5,147,737 A | 9/1992 | Post et al. |
| 5,147,739 A | 9/1992 | Beard |
| 5,160,712 A | 11/1992 | Thackeray et al. |
| 5,162,170 A | 11/1992 | Miyabayashi et al. |
| 5,162,178 A | 11/1992 | Ohsawa et al. |
| 5,169,736 A | 12/1992 | Bittihn et al. |
| 5,176,969 A | 1/1993 | Miyabayashi et al. |
| 5,187,033 A | 2/1993 | Koshiba |
| 5,187,035 A | 2/1993 | Miyabayashi et al. |
| 5,196,279 A | 3/1993 | Tarascon |
| 5,264,201 A | 11/1993 | Dahn et al. |
| 5,284,721 A | 2/1994 | Beard |
| 5,296,318 A | 3/1994 | Gozdz et al. |
| 5,300,373 A | 4/1994 | Shackle |
| 5,322,746 A | 6/1994 | Wainwright |
| 5,340,666 A | 8/1994 | Tomantschger et al. |
| 5,401,598 A | 3/1995 | Miyabayashi et al. |
| 5,411,537 A | 5/1995 | Munshi et al. |
| 5,418,090 A | 5/1995 | Koksbang et al. |
| 5,478,668 A | 12/1995 | Gozdz et al. |
| 5,498,489 A | 3/1996 | Dasgupta et al. |
| 5,510,212 A | 4/1996 | Delnick et al. |
| 5,525,441 A | 6/1996 | Reddy et al. |
| 5,545,468 A | 8/1996 | Koshiba et al. |
| 5,547,785 A | 8/1996 | Yumiba et al. |
| 5,569,553 A | 10/1996 | Smesko et al. |
| 5,576,608 A | 11/1996 | Nagai et al. |
| 5,652,072 A | 7/1997 | Lamanna et al. |
| 5,670,862 A | 9/1997 | Lewyn |
| 5,691,081 A | 11/1997 | Krause et al. |
| 5,744,258 A | 4/1998 | Bai et al. |
| 5,744,264 A | 4/1998 | Barker |
| 5,776,628 A | 7/1998 | Kraft et al. |
| 5,851,696 A | 12/1998 | Saidi et al. |
| 5,882,218 A | 3/1999 | Reimers |
| 5,888,665 A | 3/1999 | Bugga et al. |
| 5,891,592 A | 4/1999 | Mao et al. |
| 5,911,947 A | 6/1999 | Mitchell |
| 5,935,724 A | 8/1999 | Spillman et al. |
| 5,935,728 A | 8/1999 | Spillman et al. |
| 5,968,681 A | 10/1999 | Miura et al. |
| 6,001,139 A | 12/1999 | Asanuma et al. |
| 6,001,507 A | 12/1999 | Ono et al. |
| 6,007,947 A | 12/1999 | Mayer |
| 6,022,643 A | 2/2000 | Lee et al. |
| 6,025,093 A | 2/2000 | Herr |
| 6,060,186 A | 5/2000 | Broussely |
| 6,067,474 A | 5/2000 | Schulman et al. |
| 6,120,938 A | 9/2000 | Atsumi et al. |
| 6,139,815 A | 10/2000 | Atsumi et al. |
| 6,157,706 A | 12/2000 | Rachelson |
| 6,165,638 A | 12/2000 | Spillman et al. |
| 6,165,646 A | 12/2000 | Takada et al. |
| 6,171,729 B1 | 1/2001 | Gan et al. |
| 6,203,947 B1 | 3/2001 | Peled et al. |
| 6,203,994 B1 | 3/2001 | Epps et al. |
| 6,207,327 B1 | 3/2001 | Takada et al. |
| 6,221,531 B1 | 4/2001 | Vaughey et al. |
| 6,228,536 B1 | 5/2001 | Wasynczuk |
| 6,258,473 B1 | 7/2001 | Spillman et al. |
| 6,265,100 B1 | 7/2001 | Saaski et al. |
| 6,274,271 B1 | 8/2001 | Koshiba et al. |
| 6,287,721 B1 | 9/2001 | Xie et al. |
| 6,316,145 B1 | 11/2001 | Kida et al. |
| 6,335,115 B1 | 1/2002 | Meissner |
| 6,352,798 B1 | 3/2002 | Lee et al. |
| 6,365,301 B1 | 4/2002 | Michot et al. |
| 6,372,384 B1 | 4/2002 | Fujimoto et al. |
| 6,379,841 B1 | 4/2002 | Potanin et al. |
| 6,379,842 B1 | 4/2002 | Mayer |
| 6,451,480 B1 | 9/2002 | Gustafson et al. |
| 6,453,198 B1 | 9/2002 | Torgerson et al. |
| 6,461,751 B1 | 10/2002 | Boehm et al. |
| 6,461,757 B1 | 10/2002 | Sasayama et al. |
| 6,475,673 B1 | 11/2002 | Yamawaki et al. |
| 6,489,062 B1 | 12/2002 | Watanabe et al. |
| 6,503,662 B1 | 1/2003 | Hamamoto et al. |
| 6,528,208 B1 | 3/2003 | Thackeray et al. |
| 6,553,263 B1 | 4/2003 | Meadows et al. |
| 6,596,439 B1 | 7/2003 | Tsukamoto et al. |
| 6,603,146 B1 | 8/2003 | Hata et al. |
| 6,605,382 B2 | 8/2003 | Ruth et al. |
| 6,641,953 B2 | 11/2003 | Takeuchi et al. |
| 6,645,670 B2 | 11/2003 | Gan |
| 6,645,675 B1 | 11/2003 | Munshi |
| 6,670,071 B2 | 12/2003 | Skinlo et al. |
| 6,673,493 B2 | 1/2004 | Gan et al. |
| 6,677,083 B2 | 1/2004 | Suzuki et al. |
| 6,706,445 B2 | 3/2004 | Barker et al. |
| 6,720,110 B2 | 4/2004 | Barker et al. |
| 6,720,112 B2 | 4/2004 | Barker et al. |
| 6,730,437 B2 | 5/2004 | Leising et al. |
| 6,732,384 B2 | 5/2004 | Scott |
| 6,737,191 B2 | 5/2004 | Gan et al. |
| 6,759,168 B2 | 7/2004 | Yamasaki et al. |
| 6,761,744 B1 | 7/2004 | Tsukamoto et al. |
| 6,777,132 B2 | 8/2004 | Barker et al. |
| 6,824,920 B1 | 11/2004 | Iwamoto et al. |
| 6,841,304 B2 | 1/2005 | Michot et al. |
| 6,849,360 B2 | 2/2005 | Marple |
| 6,869,724 B2 | 3/2005 | Suzuki et al. |
| 6,905,795 B2 | 6/2005 | Jung et al. |
| 6,905,796 B2 | 6/2005 | Ishida et al. |
| 6,908,711 B2 | 6/2005 | Fauteux et al. |
| 6,942,949 B2 | 9/2005 | Besenhard et al. |
| 6,946,218 B2 | 9/2005 | Crouch et al. |
| 6,951,576 B1 | 10/2005 | Takeuchi |
| 7,018,743 B2 | 3/2006 | Guidi et al. |
| 7,029,793 B2 | 4/2006 | Nakagawa et al. |
| 7,101,642 B2 | 9/2006 | Tsukamoto et al. |
| 7,157,185 B2 | 1/2007 | Marple |
| 7,177,691 B2 | 2/2007 | Meadows et al. |
| 7,184,836 B1 | 2/2007 | Meadows et al. |
| 7,189,475 B2 | 3/2007 | Sasaki et al. |
| 7,191,008 B2 | 3/2007 | Schmidt et al. |
| 7,195,844 B2 | 3/2007 | Suzuki et al. |
| 7,202,000 B2 | 4/2007 | Iriyama et al. |
| 7,207,415 B2 | 4/2007 | McGehee |
| 7,211,350 B2 | 5/2007 | Amatucci |
| 7,337,010 B2 | 2/2008 | Howard et al. |
| 7,341,803 B2 | 3/2008 | Huang et al. |
| 7,392,117 B1 | 6/2008 | Bilodeau et al. |
| 7,435,492 B2 | 10/2008 | Ovshinsky et al. |
| 7,459,235 B2 | 12/2008 | Choi et al. |
| 7,462,425 B2 | 12/2008 | Takami et al. |
| 7,488,553 B2 | 2/2009 | Tsukamoto et al. |
| 7,524,580 B1 | 4/2009 | Birke et al. |
| 7,541,114 B2 | 6/2009 | Ohzuku et al. |
| 7,563,541 B2 | 7/2009 | Howard et al. |
| 7,582,380 B1 | 9/2009 | Dunstan et al. |
| 7,582,387 B2 | 9/2009 | Howard et al. |
| 7,632,603 B2 | 12/2009 | Tsukamoto et al. |
| 7,635,541 B2 | 12/2009 | Scott et al. |
| 7,641,992 B2 | 1/2010 | Howard et al. |
| 7,642,013 B2 | 1/2010 | Howard et al. |
| 7,662,509 B2 | 2/2010 | Howard et al. |
| 7,662,515 B2 | 2/2010 | Inagaki et al. |
| 7,682,745 B2 | 3/2010 | Howard et al. |
| 7,740,985 B2 | 6/2010 | Howard et al. |
| 7,794,869 B2 | 9/2010 | Howard et al. |
| 7,799,470 B2 | 9/2010 | Cho et al. |
| 7,803,481 B2 | 9/2010 | Howard et al. |
| 7,807,299 B2 | 10/2010 | Howard et al. |
| 7,811,703 B2 | 10/2010 | Fujita et al. |
| 7,811,705 B2 | 10/2010 | Scott et al. |
| 7,818,068 B2 | 10/2010 | Meadows et al. |
| 7,858,236 B2 | 12/2010 | Howard et al. |
| 7,875,389 B2 | 1/2011 | Scott et al. |
| 7,879,495 B2 | 2/2011 | Howard et al. |
| 7,883,790 B2 | 2/2011 | Howard et al. |

(56) References Cited

U.S. PATENT DOCUMENTS

| | | | |
|---|---|---|---|
| 7,927,742 B2 | 4/2011 | Scott et al. |
| 7,931,987 B2 | 4/2011 | Howard et al. |
| 2001/0008725 A1 | 7/2001 | Howard |
| 2001/0012590 A1 | 8/2001 | Ehrlich |
| 2001/0021472 A1 | 9/2001 | Barker et al. |
| 2001/0031401 A1 | 10/2001 | Yamawaki et al. |
| 2003/0025482 A1 | 2/2003 | Tsukamoto et al. |
| 2003/0104282 A1 | 6/2003 | Xing et al. |
| 2003/0124423 A1 | 7/2003 | Sasaki et al. |
| 2003/0129485 A1 | 7/2003 | Guidi et al. |
| 2003/0157410 A1 | 8/2003 | Jarvis et al. |
| 2003/0190531 A1 | 10/2003 | Otsuki et al. |
| 2003/0215716 A1 | 11/2003 | Suzuki et al. |
| 2004/0002005 A1 | 1/2004 | Gao et al. |
| 2004/0023117 A1 | 2/2004 | Imachi et al. |
| 2004/0029156 A1 | 2/2004 | Matson et al. |
| 2004/0062989 A1 | 4/2004 | Ueno et al. |
| 2004/0072072 A1 | 4/2004 | Suzuki et al. |
| 2004/0096745 A1 | 5/2004 | Shibano et al. |
| 2004/0147971 A1 | 7/2004 | Greatbatch et al. |
| 2004/0147972 A1 | 7/2004 | Greatbatch et al. |
| 2004/0158296 A1 | 8/2004 | Greatbatch et al. |
| 2004/0168307 A1 | 9/2004 | Hong |
| 2004/0176818 A1 | 9/2004 | Wahlstrand et al. |
| 2004/0197657 A1 | 10/2004 | Spitler et al. |
| 2004/0209156 A1 | 10/2004 | Ren et al. |
| 2005/0031919 A1 | 2/2005 | Ovshinsky et al. |
| 2005/0069777 A1 | 3/2005 | Takami et al. |
| 2005/0130043 A1 | 6/2005 | Gao et al. |
| 2005/0147889 A1 | 7/2005 | Ohzuku et al. |
| 2005/0164082 A1 | 7/2005 | Kishi et al. |
| 2005/0244716 A1 | 11/2005 | Ogawa et al. |
| 2006/0024582 A1 | 2/2006 | Li et al. |
| 2006/0046149 A1 | 3/2006 | Yong et al. |
| 2006/0068282 A1 | 3/2006 | Kishi et al. |
| 2006/0090962 A1 | 5/2006 | McGehee |
| 2006/0091572 A1 | 5/2006 | Santra et al. |
| 2006/0093871 A1* | 5/2006 | Howard et al. .......... 429/9 |
| 2006/0093872 A1 | 5/2006 | Howard et al. |
| 2006/0093873 A1 | 5/2006 | Howard et al. |
| 2006/0093894 A1 | 5/2006 | Scott et al. |
| 2006/0093913 A1 | 5/2006 | Howard et al. |
| 2006/0093916 A1 | 5/2006 | Howard et al. |
| 2006/0093917 A1 | 5/2006 | Howard et al. |
| 2006/0093918 A1 | 5/2006 | Howard et al. |
| 2006/0093921 A1 | 5/2006 | Scott et al. |
| 2006/0093923 A1 | 5/2006 | Howard et al. |
| 2006/0095094 A1 | 5/2006 | Howard et al. |
| 2006/0216612 A1 | 9/2006 | Jambunathan et al. |
| 2006/0234125 A1 | 10/2006 | Valle |
| 2006/0243598 A1 | 11/2006 | Singh et al. |
| 2006/0251968 A1 | 11/2006 | Tsukamoto et al. |
| 2007/0009801 A1 | 1/2007 | Inagaki et al. |
| 2007/0059587 A1 | 3/2007 | Kishi et al. |
| 2007/0072085 A1 | 3/2007 | Chen et al. |
| 2007/0077496 A1 | 4/2007 | Scott et al. |
| 2007/0111099 A1 | 5/2007 | Nanjundaswamy et al. |
| 2007/0134556 A1 | 6/2007 | Sano et al. |
| 2007/0135662 A1 | 6/2007 | Nardello et al. |
| 2007/0162083 A1 | 7/2007 | Schmidt et al. |
| 2007/0233195 A1 | 10/2007 | Wahlstrand et al. |
| 2007/0239221 A1 | 10/2007 | Kast et al. |
| 2007/0248881 A1 | 10/2007 | Scott et al. |
| 2007/0284159 A1 | 12/2007 | Takami et al. |
| 2008/0002626 A1 | 1/2008 | Yokoyama |
| 2008/0020278 A1 | 1/2008 | Schmidt et al. |
| 2008/0020279 A1 | 1/2008 | Schmidt et al. |
| 2008/0026297 A1 | 1/2008 | Chen et al. |
| 2008/0044728 A1 | 2/2008 | Schmidt et al. |
| 2008/0176142 A1 | 7/2008 | Inagaki et al. |
| 2008/0241689 A1 | 10/2008 | Takami et al. |
| 2009/0035662 A1 | 2/2009 | Scott et al. |
| 2009/0075166 A1 | 3/2009 | Takami et al. |
| 2009/0208834 A1 | 8/2009 | Ramasubramanian et al. |
| 2009/0208835 A1 | 8/2009 | Horiuchi et al. |
| 2009/0208845 A1 | 8/2009 | Howard et al. |
| 2009/0274849 A1 | 11/2009 | Scott et al. |
| 2009/0286151 A1 | 11/2009 | Scott et al. |
| 2010/0076523 A1 | 3/2010 | Howard et al. |
| 2010/0239908 A1 | 9/2010 | Howard et al. |
| 2010/0279155 A1 | 11/2010 | Scott et al. |
| 2010/0316898 A1 | 12/2010 | Howard et al. |
| 2011/0133699 A1 | 6/2011 | Howard et al. |
| 2011/0183210 A1 | 7/2011 | Howard et al. |
| 2011/0281148 A1 | 11/2011 | Scott et al. |

FOREIGN PATENT DOCUMENTS

| | | |
|---|---|---|
| EP | 0 982 790 A1 | 3/2000 |
| EP | 1 014 465 A1 | 6/2000 |
| EP | 1 018 773 A1 | 7/2000 |
| EP | 1 069 635 A1 | 1/2001 |
| EP | 0 567 149 B1 | 11/2001 |
| EP | 1 267 111 A1 | 12/2002 |
| EP | 1 282 180 A1 | 2/2003 |
| EP | 1 487 039 A1 | 12/2004 |
| EP | 1 722 439 A1 | 11/2006 |
| JP | 56136462 | 10/1981 |
| JP | 57011476 | 1/1982 |
| JP | 57152669 | 9/1982 |
| JP | 02309568 | 12/1990 |
| JP | H05-166538 | 7/1993 |
| JP | 06275263 | 9/1994 |
| JP | 1027626 | 1/1998 |
| JP | 10-208748 | 8/1998 |
| JP | 2000156229 | 6/2000 |
| JP | 2000195499 | 7/2000 |
| JP | 2001126756 | 5/2001 |
| JP | 2001185141 A | 7/2001 |
| JP | 2001-210324 | 8/2001 |
| JP | 2001-513679 | 9/2001 |
| JP | 2004-010520 | 1/2004 |
| WO | WO97/06569 A1 | 2/1997 |
| WO | WO97/48141 A1 | 12/1997 |
| WO | WO00/17950 A1 | 3/2000 |
| WO | WO0133656 A1 | 5/2001 |
| WO | WO02/09215 A2 | 1/2002 |
| WO | WO02/21628 A1 | 3/2002 |
| WO | WO02/39524 A1 | 5/2002 |
| WO | WO02/069414 A2 | 9/2002 |
| WO | WO02/095845 A1 | 11/2002 |
| WO | WO03/044880 A1 | 5/2003 |
| WO | WO03/075371 A2 | 9/2003 |
| WO | WO03/075376 A1 | 9/2003 |
| WO | WO03/090293 A2 | 10/2003 |
| WO | WO 2006/050022 A2 | 5/2006 |
| WO | WO 2006/050023 A2 | 5/2006 |
| WO | WO 2006/050098 A1 | 5/2006 |
| WO | WO 2006/050099 A1 | 5/2006 |
| WO | WO 2006/050100 A2 | 5/2006 |
| WO | WO 2006/050117 A2 | 5/2006 |
| WO | WO 2006/064344 A2 | 6/2006 |

OTHER PUBLICATIONS

Ariyoshi et al., Three-Volt Lithium-Ion Battery with Li[Ni1/2Mn3/2]O4 and the Zero-Strain Insertion Material of Li[Li⅓Ti⁵⁄₃]O4, Journal of Power Sources, 2003, 5 pages.

Battery Materials, Ceramic Anode Material for 2.4 V Lithium-Ion Batteries, Oct. 25, 2004, 1 page.

Belharouak et al., On the Safety of the Li4Ti5O12/LiMn2O4 Lithium-Ion Battery System, Journal of the Electrochemical Society, vol. 154, 2007, 5 pages.

Brohan et al., Properties Physiques Des Bronzes MxTiO2(B), Solid State Ionics, 1983, 6 pages.

Cava et al., The Crystal Structures of the Lithium-Inserted Metal Oxides Li0.5TiO2 Anatase, LiTi2O4 Spinel, and Li2Ti2O4, Journal of Solid State Chemistry, vol. 53, 1984, 12 pages.

Christensen et al., Optimization of Lithium Titanate Electrodes for High-Power Cells, (ECS) Journal of the Electrochemical Society, vol. 153, 2006, 6 pages.

(56) References Cited

OTHER PUBLICATIONS

Colbow et al., Structure and Electrochemistry of the Spinel Oxides LiTi2O4 and Li4/3Ti5/3O4, Journal of Power Sources 26, 1989, 6 pages.
Dahn et al., Combinatorial Study of Sn1-xCox (0<x<0.6) and [Sn0.55Co0.45]1-yCy (0<y<0.5) Alloy Negative Electrode Materials for Li-Ion Batteries, Journal of Electrochemical Society, vol. 153, 2006, 5 pages.
Fauteux et al., Rechargeable Lithium Battery Anodes: Alternatives to Metallic Lithium, Journal of Applied Electrochemistry, vol. 23, 1993, 10 pages.
Ferg et al., Spinel Anodes for Lithium-Ion Batteries, J. Electrochem. Soc. 141, Nov. 1994, 4 pages.
FMC Lithium, CAS No. 74389-93-2, Stabilized Lithium Metal Powder, Product Specification, 2001, 2 pages.
Guerfi et al., Nano Electronically Conductive Titanium-Spinel as Lithium Ion Storage Negative Electrode, Journal of Power Sources, 2004, 6 pages.
Guyomard et al., New Amorphous Oxides as High Capacity Negative Electrodes for Lithium 6 Batteries the LixMV04 (M=Ni, Co, Cd, Zn; 1<x<8) Series, Journal of Power Sources 68, 1997, 6 pages.
Jansen et al., Development of a High-Power Lithium-Ion Battery, Journal of Power Sources, 81-82, 1999, 4 pages.
Jarvis et al., A Li-Ion Cell Containing a Non-Lithiated Cathode, Abs. 182, IMLB 12 Meeting, 2004, 1 page.
Kavan et al., Proof of Concept-Li4Ti5O12, Electrochemical and Solid State Letters, 2002, vol. 5, 1 page.
Linden, Handbook of Batteries, 1995, 6 pages.
Medtronic Activa® Product Family and Procedure Solution Product Specifications, 2003, 6 pages.
Medtronic Neurostimulation Systems Product Brochure, 2002, 6 pages.
Mikula et al., Photoelectrochemical Properties of Anodic TiO2 Layers Prepared by Various Current Densities, J. Electrochemical Society, vol. 139, Dec. 1992, 5 pages.
Murphy et al., Lithium Insertion in Anatase: A New Route to the Spinel LiTi2O4, Revue De Chimie Minerale, vol. 19, 1982, 5 pages.
Murphy et al., Ternary LixTiO2 Phases from Insertion Reactions, Solid State Ionics, vols. 9-10, 1983, 5 pages.
Murphy et al., Topochemical Reactions of Rutile Related Structures with Lithium, Mat. Res. Bull, vol. 13, 8 pages.
Nakahara et al., Preparation of Particulate Li4Ti5O12 Having Excellent Characteristics as an Electrode Active Material for Power Storage Cells, Journal of Power Sources, 2003, 6 pages.
New Li4Ti5O12 Anode Material of Süd-Chemie AG for Lithium Ion Batteries, Süd-Chemie EXM 1037-Li4Ti5O12, Product Specification, 2 pages.
Ohzuku et al., Lithium-Ion Batteries of Li[Li1/3Ti5/3]O4 With Selected Positive-Electrode Materials for Long-Life Power Application, Abs. 23, IMLB 12 Meeting, 2004, 1 page.
Ohzuku et al., Why Transition Metal (Di)oxides are the Most Attractive Materials for Batteries, Solid State Ionics, vol. 69, 1994, 11 pages.
Ohzuku et al., Zero-Strain Insertion Material of Li[Li1/3Ti5/3]O4 for Rechargeable Lithium Cells, J. Electrochem. Soc., vol. 142, 1995, 5 pages.
Ohzuku, Extended Abstracts from the Seventh Int'l Meeting on Li Batteries, May 15-20, 1994, 3 pages.
Peramunage et al., Preparation of Micro-Sized Li4Ti5O12 and Its Electrochemistry in Polyacrylonitrile Electrolye-Based Lithium Cells, Technical Papers, Electrochemical Science and Technology, J. Electrochem Soc., vol. 145, Aug. 1998, 8 pages.
Poizot et al., Nano-Sized Transition-Metal Oxides as Negative-Electrode Materials for Lithium-Ion Batteries, Nature, vol. 407, 2000, 5 pages.
Prosini et al., Li4Ti5O12 as Anode in All-Solid-State, Plastic, Lithium-Ion Batteries for Low-Power Applications, Solid State Ionics, 2001, 8 pages.

Sasaki et al., Layered Hydrous Titanium Dioxide: Potassium Ion Exchange and Structural Characterization, Inorganic Chemistry, 4 pages.
Sawai et al., Factors Affecting Rate Capability of a Lithium-ion Battery with Li[Li1/3Ti5/3]O4 and LiCo1/2Ni1/2O2, Abs. 75, 2004, 3 pages.
Scrosati, Low Voltage Lithium-Ion Cells, Advances in Lithium-Ion Batteries, 21 pages.
Singhal et al., Nanostructured Electrodes for Next Generation Rechargeable Electrochemical Devices, Journal of Power Sources, 2004, 7 pages.
Sun et al., Using a Boron-Based Anion Receptor Additive to Improve the Thermal Stability of LiPF6-Based Electrolyte for Lithium Batteries, (ECS) Electrochemical and Solid-State Letters, 2002, 4 pages.
Sun et al., The Compatibility of a Boron-Based Anion Receptor with the Carbon Anode in Lithium-Ion Batteries, Electrochemical and Solid-State Letters, 2003, 4 pages.
Trifonova et al., Sn—Sb and Sn Bi Alloys as Anode Materials for Lithium-Ion Batteries, Ionics, vol. 8, 2002, 9 pages.
Wang et al., Li Insertion and Ion Exchange Reactions in the Ionic Conducting Tl2(M,Ti)8O16 Phases with Hollandite-Type Structure, J. Electrochem Soc., vol. 38, Jan. 1991, 7 pages.
Wang et al., Novel Electrolytes for Nanocrystalline Li4Ti5O12 Based High Power Lithium Ion Batteries, 1 page.
Winter et al., Insertion Electrode Materials for Rechargeable Lithium Batteries, Advanced Materials, vol. 10, 1998, 38 pages.
Winter et al., Electrochemical Lithiation of Tin and Tin Based Intermetallics and Composites, Electrochimica Acta, vol. 45, 1999, 10 pages.
XKnife™ RT, Integra Radionics, www.radionics.com, Jul. 10, 2006, 2 pages.
Zaghib et al., Electrochemical Study of Li4Ti5O12 as Negative Electrode for Li-Ion Polymer Rechargeable Batteries, Journal of Power Sources, 81-82, 1999, 6 pages.
Restriction Requirement for U.S. Appl. No. 12/564,818, mail date Feb. 3, 2010, 8 pages.
Amendment and Reply for U.S. Appl. No. 12/564,818, mail date Mar. 3, 2010, 9 pages.
Office Action for U.S. Appl. No. 12/564,818, mail date Jun. 17, 2010, 10 pages.
Amendment and Reply for U.S. Appl. No. 12/564,818, mail date Sep. 15, 2010, 13 pages.
Terminal Disclaimer for U.S. Appl. No. 12/564,818, mail date Sep. 15, 2010, 1 page.
Terminal Disclaimer Review Decision for U.S. Appl. No. 12/564,818, mail date Oct. 6, 2010, 1 page.
Notice of Allowance for U.S. Appl. No. 12/564,818, mail date Nov. 29, 2010, 8 pages.
Restriction Requirement for U.S. Appl. No. 10/978,970, mail date Dec. 28, 2007, 8 pages.
Amendment and Reply for U.S. Appl. No. 10/978,970, mail date Jan. 25, 2008, 15 pages.
Office Action for U.S. Appl. No. 10/978,970, mail date Mar. 18, 2008, 18 pages.
Amendment and Reply for U.S. Appl. No. 10/978,970, mail date Jul. 18, 2008, 26 pages.
Office Action for U.S. Appl. No. 10/978,970, mail date Nov. 5, 2008, 17 pages.
Request for Continued Examination and Amendment and Reply for U.S. Appl. No. 10/978,970, mail date Feb. 5, 2009, 31 pages.
Office Action for U.S. Appl. No. 10/978,970, mail date Mar. 23, 2009, 7 pages.
Amendment and Reply for U.S. Appl. No. 10/978,970, mail date Jun. 12, 2009, 16 pages.
Notice of Allowance for U.S. Appl. No. 10/978,970, mail date Jun. 30, 2009, 8 pages.
Amendment for U.S. Appl. No. 10/978,970, mail date Sep. 16, 2009, 3 pages.
Office Action for U.S. Appl. No. 10/978,970, mail date Sep. 30, 2009, 2 pages.
Restriction Requirement for U.S. Appl. No. 10/978,680, mail date Dec. 26, 2007, 7 pages.

(56) References Cited

OTHER PUBLICATIONS

Amendment and Reply for U.S. Appl. No. 10/978,680, mail date Jan. 25, 2008, 11 pages.
Office Action for U.S. Appl. No. 10/978,680, mail date Mar. 11, 2008, 15 pages.
International Search Report regarding Application No. PCT/US2012/068509 mailed Mar. 11, 2013.
Amendment and Reply for U.S. Appl. No. 12/511,942, mail date May 11, 2010, 10 pages.
Notice of Allowance for U.S. Appl. No. 12/511,942, mail date Jun. 2, 2010, 4 pages.
Office Action for U.S. Appl. No. 10/978,617, mail date Apr. 2, 2008, 12 pages.
Amendment and Reply for U.S. Appl. No. 10/978,617, mail date Jul. 2, 2008, 9 pages.
Office Action for U.S. Appl. No. 10/978,617, mail date Oct. 10, 2008, 5 pages.
Amendment and Reply for U.S. Appl. No. 10/978,617, mail date Dec. 11, 2008, 11 pages.
Notice of Allowance for U.S. Appl. No. 10/978,617, mail date Feb. 27, 2009, 7 pages.
Restriction Requirement for U.S. Appl. No. 10/979,041, mail date Jan. 30, 2008, 8 pages.
Amendment and Reply for U.S. Appl. No. 10/979,041, mail date Feb. 22, 2008, 6 pages.
Office Action for U.S. Appl. No. 10/979,041, mail date Apr. 4, 2008, 13 pages.
Amendment and Reply for U.S. Appl. No. 10/979,041, mail date Aug. 4, 2008, 18 pages.
Office Action for U.S. Appl. No. 10/979,041, mail date Oct. 20, 2008, 11 pages.
Amendment and Reply for U.S. Appl. No. 10/979,041, mail date Mar. 6, 2009, 19 pages.
Terminal Disclaimer for U.S. Appl. No. 10/979,041, mail date Apr. 21, 2009, 3 pages.
Terminal Disclaimer Review Decision for U.S. Appl. No. 10/979,041, mail date Apr. 22, 2009, 1 page.
Notice of Allowance for U.S. Appl. No. 10/979,041, mail date Apr. 30, 2009, 7 pages.
Office Action for U.S. Appl. No. 13/081,050, mail date May 13, 2011, 7 pages.
Amendment and Reply for U.S. Appl. No. 13/081,050, mail date Aug. 15, 2011, 12 pages.
Office Action for U.S. Appl. No. 13/081,050, mail date Oct. 14, 2011, 8 pages.
Restriction Requirement for U.S. Appl. No. 12/789,149, mail date Aug. 5, 2010, 9 pages.
Advisory Action for U.S. Appl. No. 12/789,149 mail date Sep. 7, 2010, 3 pages.
Amendment and Reply for U.S. Appl. No. 12/789,149, mail date Sep. 7, 2010, 8 pages.
Office Action for U.S. Appl. No. 12/789,149, mail date Nov. 1, 2010, 6 pages.
Amendment and Reply for U.S. Appl. No. 12/789,149, mail date Nov. 9, 2010, 9 pages.
Terminal Disclaimer for U.S. Appl. No. 12/789,149, mail date Nov. 9, 2010, 1 page.
Review Decision for U.S. Appl. No. 12/789,149, mail date Nov. 12, 2010, 1 page.
Notice of Allowance for U.S. Appl. No. 12/789,149, mail date Dec. 23, 2010, 4 pages.
Restriction Requirement for U.S. Appl. No. 12/429,061, mail date Sep. 4, 2009, 8 pages.
Amendment and Reply for U.S. Appl. No. 12/429,061, mail date Oct. 2, 2009, 8 pages.
Office Action for U.S. Appl. No. 12/429,061, mail date Nov. 16, 2009, 5 pages.
Terminal Disclaimer for U.S. Appl. No. 12/429,061, mail date Feb. 15, 2010, 1 page.
Amendment and Reply for U.S. Appl. No. 12/429,061, mail date Feb. 15, 2010, 8 pages.
Terminal Disclaimer Review Decision for U.S. Appl. No. 12/429,061, mail date Mar. 16, 2010, 1 page.
Notice of Allowance for U.S. Appl. No. 12/429,061, mail date Mar. 26, 2010, 6 pages.
Restriction Requirement for U.S. Appl. No. 12/510,857, mail date Oct. 15, 2009, 8 pages.
Amendment and Reply for U.S. Appl. No. 12/510,857, mail date Dec. 9, 2009, 9 pages.
Office Action for U.S. Appl. No. 12/510,857, mail date Feb. 19, 2010, 8 pages.
Amendment and Reply for U.S. Appl. No. 12/510,857, mail date Jun. 21, 2010, 16 pages.
Office Action for U.S. Appl. No. 12/510,857, mail date Aug. 3, 2010, 6 pages.
Terminal Disclaimer for U.S. Appl. No. 12/510,857, mail date Aug. 30, 2010, 3 pages.
Amendment and Reply for U.S. Appl. No. 12/510,857, mail date Aug. 30, 2010, 6 pages.
Terminal Disclaimer Review Decision for U.S. Appl. No. 12/510,857, mail date Sep. 1, 2010, 1 page.
Advisory Action for U.S. Appl. No. 12/510,857, mail date Sep. 3, 2010, 3 pages.
Amendment and Reply for U.S. Appl. No. 12/510,857, mail date Sep. 22, 2010, 6 pages.
Terminal Disclaimer for U.S. Appl. No. 12/510,857, mail date Sep. 22, 2010, 1 page.
Review Decision for U.S. Appl. No. 12/510,857, mail date Sep. 25, 2010, 1 page.
Advisory Action for U.S. Appl. No. 12/510,857, mail date Sep. 30, 2010, 2 pages.
Advisory Action for U.S. Appl. No. 12/510,857, mail date Oct. 14, 2010, 3 pages.
Amendment and Reply for U.S. Appl. No. 12/510,857, mail date Nov. 3, 2010, 6 pages.
Notice of Allowance for U.S. Appl. No. 12/510,857, mail date Nov. 12, 2010, 9 pages.
International Search Report for Application No. PCT/US2005/038762, mail date Oct. 2, 2005, 2 pages.
Amendment and Reply for U.S. Appl. No. 10/978,680, mail date May 23, 2008, 14 pages.
Office Action for U.S. Appl. No. 10/978,680, mail date Jul. 9, 2008, 16 pages.
Request for Continued Examination and Amendment and Reply for U.S. Appl. No. 10/978,680, mail date Sep. 29, 2008, 21 pages.
Office Action for U.S. Appl. No. 10/978,680, mail date Oct. 29, 2008, 14 pages.
Amendment and Reply for U.S. Appl. No. 10/978,680, mail date Jan. 20, 2009, 15 pages.
Office Action for U.S. Appl. No. 10/978,680, mail date Apr. 2, 2009, 16 pages.
Amendment and Reply for U.S. Appl. No. 10/978,680, mail date Jun. 26, 2009, 19 pages.
Office Action for U.S. Appl. No. 10/978,680, mail date Oct. 13, 2009, 22 pages.
Amendment and Reply for U.S. Appl. No. 10/978,680, mail date Jan. 13, 2010, 16 pages.
Office Action for U.S. Appl. No. 10/978,680, mail date Apr. 13, 2010, 23 pages.
Amendment and Reply for U.S. Appl. No. 10/978,680, mail date Jun. 11, 2010, 18 pages.
Advisory Action for U.S. Appl. No. 10/978,680, mail date Jun. 24, 2010, 3 pages.
Request for Continued Examination and Amendment and Reply for U.S. Appl. No. 10/978,680, mail date Aug. 12, 2010, 22 pages.
Notice of Allowance for U.S. Appl. No. 10/978,680, mail date Sep. 13, 2010, 9 pages.
Office Action for U.S. Appl. No. 10/978,681, mail date Mar. 18, 2008, 6 pages.
Terminal Disclaimer for U.S. Appl. No. 10/978,681, mail date May 28, 2008, 3 pages.

(56) References Cited

OTHER PUBLICATIONS

Amendment and Reply for U.S. Appl. No. 10/978,681, mail date May 28, 2008, 14 pages.
Terminal Disclaimer Review Decision for U.S. Appl. No. 10/978,681, mail date Jun. 25, 2008, 1 page.
Notice of Allowance for U.S. Appl. No. 10/978,681, mail date Jul. 16, 2008, 8 pages.
Request for Continued Examination for U.S. Appl. No. 10/978,681, mail date Oct. 2, 2008, 4 pages.
Notice of Allowance for U.S. Appl. No. 10/978,681, mail date Oct. 24, 2008, 8 pages.
Office Action for U.S. Appl. No. 10/978,681, mail date Dec. 9, 2008, 13 pages.
Amendment and Reply for U.S. Appl. No. 10/978,681, mail date Mar. 6, 2009, 20 pages.
Office Action for U.S. Appl. No. 10/978,681, mail date May 22, 2009, 7 pages.
Terminal Disclaimer for U.S. Appl. No. 10/978,681, mail date Jul. 20, 2009, 3 pages.
Amendment and Reply for U.S. Appl. No. 10/978,681, mail date Jul. 20, 2009, 13 pages.
Notice of Allowance for U.S. Appl. No. 10/978,681, mail date Sep. 22, 2009, 7 pages.
Restriction Requirement for U.S. Appl. No. 10/978,722, mail date Dec. 14, 2006, 6 pages.
Amendment and Reply for U.S. Appl. No. 10/978,722, mail date Jan. 16, 2007, 12 pages.
Office Action for U.S. Appl. No. 10/978,722, mail date Mar. 29, 2007, 12 pages.
Amendment and Reply for U.S. Appl. No. 10/978,722, mail date Jul. 30, 2007, 15 pages.
Office Action for U.S. Appl. No. 10/978,722, mail date Oct. 9, 2007, 6 pages.
Amendment and Reply for U.S. Appl. No. 10/978,722, mail date Jan. 9, 2008, 18 pages.
Request for Continued Examination for U.S. Appl. No. 10/978,722, mail date Jan. 9, 2008, 4 pages.
Office Action for U.S. Appl. No. 10/978,722, mail date Mar. 14, 2008, 9 pages.
Amendment and Reply for U.S. Appl. No. 10/978,722, mail date Jul. 14, 2008, 18 pages.
Request for Continued Examination for U.S. Appl. No. 10/978,722, mail date Jul. 14, 2008, 4 pages.
Office Action for U.S. Appl. No. 10/978,722, mail date Sep. 5, 2008, 14 pages.
Terminal Disclaimer for U.S. Appl. No. 10/978,722, mail date Dec. 5, 2008, 3 pages.
Amendment and Reply for U.S. Appl. No. 10/978,722, mail date Dec. 5, 2008, 26 pages.
Terminal Disclaimer Review Decision for U.S. Appl. No. 10/978,722, mail date Jan. 2, 2009, 1 page.
Office Action for U.S. Appl. No. 10/978,722, mail date Mar. 4, 2009, 10 pages.
Amendment and Reply for U.S. Appl. No. 10/978,722, mail date Jun. 4, 2009, 19 pages.
Request for Continued Examination for U.S. Appl. No. 10/978,722, mail date Jun. 4, 2009, 4 pages.
Notice of Allowance for U.S. Appl. No. 10/978,722, mail date Jul. 9, 2009, 8 pages.
Office Action for U.S. Appl. No. 10/978,722, mail date Oct. 8, 2009, 2 pages.
Office Action for U.S. Appl. No. 12/567,415, mail date Oct. 28, 2009, 14 pages.
Amendment and Reply for U.S. Appl. No. 12/567,415, mail date Jan. 27, 2010, 15 pages.
Office Action for U.S. Appl. No. 12/567,415, mail date May 7, 2010, 5 pages.
Terminal Disclaimer for U.S. Appl. No. 12/567,415, mail date Jul. 6, 2010, 3 pages.
Amendment and Reply for U.S. Appl. No. 12/567,415, mail date Jul. 6, 2010, 9 pages.
Notice of Allowance for U.S. Appl. No. 12/567,415, mail date Jul. 22, 2010, 4 pages.
Office Action for U.S. Appl. No. 12/511,942, mail date Oct. 15, 2009, 12 pages.
Amendment and Reply for U.S. Appl. No. 12/511,942, mail date Jan. 15, 2010, 14 pages.
Office Action for U.S. Appl. No. 12/511,942, mail date Mar. 31, 2010, 4 pages.
Terminal Disclaimer for U.S. Appl. No. 12/511,942, mail date May 11, 2010, 3 pages.
International Search Report for Application No. PCT/US2005/038942, mail date Mar. 2, 2006, 3 pages.
International Search Report for Application No. PCT/US2005/038943, mail date Mar. 16, 2006, 3 pages.
International Search Report for Application No. PCT/US2005/038944, mail date Mar. 31, 2006, 3 pages.
International Search Report for Application No. PCT/US2005/038761, mail date Oct. 4, 2006, 2 pages.
International Search Report for Application No. PCT/US2005/038970, mail date, Oct. 25, 2006, 3 pages.
International Search Report and Written Opinion for Application No. PCT/US2008/066803, mail date Oct. 7, 2008, 12 pages.
International Search Report and Written Opinion for Application No. PCT/US2008/066801, mail date Oct. 29, 2008, 10 pages.
International Search Report and Written Opinion for Application No. PCT/US2008/066809, mail date Oct. 29, 2008, 8 pages.
International Search Report and Written Opinion for Application No. PCT/US2008/082598, mail date Feb. 18, 2009, 11 pages.
International Search Report and Written Opinion for Application No. PCT/US2012/048286, mail date Nov. 5, 2012, 13 pages.

* cited by examiner

BATTERY WITH AUXILIARY ELECTRODE

BACKGROUND

The present application relates to the field of batteries. More particularly, the present application relates to batteries having auxiliary electrodes that are intended to provide improved capacity fade performance.

Lithium-ion batteries or cells include one or more positive electrodes, one or more negative electrodes, and an electrolyte provided within a case or housing. Separators may be provided between the electrodes to prevent direct contact between adjacent electrodes. The positive and negative electrodes each include a current collector having an active material provided thereon. The active materials of the positive and negative electrodes may be provided on one or both sides of their respective current collectors.

FIG. 1 shows a schematic representation of a portion of a lithium-ion battery 10 such as that described above. The battery 10 includes a positive electrode 20 that includes a positive current collector 22 and a positive active material 24, a negative electrode 30 that includes a negative current collector 32 and a negative active material 34, an electrolyte material 40 disposed generally between the positive electrode 20 and the negative electrode 30, and a separator (e.g., a polymeric microporous separator; not shown) provided between the positive electrode 20 and the negative electrode 30. The electrodes 20, 30 may be provided as relatively flat or planar plates or may be wrapped or wound in a spiral or other configuration (e.g., an ovular or circular cylindrical configuration). The electrodes may also be provided in a folded configuration.

As shown in FIG. 1, during charging and discharging of the battery 10, lithium ions move between the positive electrode 20 and the negative electrode 30. For example, when the battery is discharged, lithium ions flow from the negative electrode 30 to the positive electrode 20. In contrast, when the battery 10 is charged, lithium ions flow from the positive electrode 20 to the negative electrode 30.

FIG. 4 is a graph 400 illustrating the theoretical charging and discharging behavior for a conventional lithium-ion battery having a positive electrode with an aluminum current collector and $LiCoO_2$ active material and a negative electrode with a copper current collector and a carbonaceous active material. Curves 410 and 420 represent the positive electrode potential and the negative electrode potential, respectively, versus a lithium reference electrode. The difference between the curves 410, 420 represents the overall cell voltage.

With reference to FIG. 4, during initial charging to full capacity, lithium ions are transferred from the positive electrode to the negative electrode. The potential of the positive electrode moves rightward along curve 410, increasing from approximately 3.0 volts to approximately 3.8 volts. The potential of the negative electrode moves rightward along curve 420, decreasing from approximately 2.0 volts to approximately 0.2 volts. Also during the initial charge, due to the formation of a passive layer on the negative electrode (i.e., a solid-electrolyte interface ("SEI")), the negative electrode experiences an irreversible loss of capacity (i.e., gains irreversible capacity). The irreversible capacity is represented by the shelf 424.

During a subsequent discharge, lithium ions are transferred from the negative electrode to the positive electrode. The potential of the positive electrode moves leftward along curve 410. The potential of the negative electrode moves left ward along curve 420 and, then, along dashed curve 426, until leveling off at approximately 3.5 volts (i.e., the corrosion potential of the copper negative current collector). The positive and negative potentials then meet at the crossing potential 442, where the battery is at approximately zero volts (i.e., deep discharge).

One difficulty with conventional lithium-ion batteries is the instability of the positive and negative electrodes in deep discharge conditions, because the current collectors may corrode or the active materials may decompose at certain crossing potentials. For example, referring again to FIG. 4, if the crossing potential is at or above approximately 3.5 volts (the approximate corrosion potential 450 of copper) the copper negative current collector may corrode, or a graphitic negative active material may decompose. If the crossing potential is at or below approximately 1.8 volts, the $LiCoO_2$ positive active material may decompose, or if below 0.3 volts, the aluminum positive current collector may corrode. Over time, degradation of the current collectors and active materials results in decreased ability of the positive and negative electrodes to be doped and undoped with lithium (i.e., store and transfer lithium). Accordingly, battery capacity is lost over time (i.e., the battery experiences capacity fade).

Further, the instability of battery electrodes and capacity fade occurring in deep discharge conditions is compounded by unpredictable shifts in crossing potential caused by changes in relative irreversible capacity of the positive and negative electrodes. For example, referring again to FIG. 4, if the positive electrode were to experience higher irreversible capacity loss than the negative electrode, a negative crossing potential would result (i.e., a crossing potential at or near the average potential of the negative electrode). During discharge, the potential of the positive electrode would move leftward along curve 410 until becoming fully saturated with lithium (i.e., before the negative electrode may become fully depleted), and the potential of the positive electrode would rapidly approach the potential of the negative electrode 420 to achieve a negative crossing potential (i.e., at the average potential of the carbonaceous negative active materials). This crossing potential would be below the decomposition potential 460 of the $LiCoO_2$ positive active material and would, thus, cause the positive active material to decompose and the battery to lose capacity.

Accordingly, it would be advantageous to provide a lithium-ion battery with increased resistance to capacity fade and a controlled and well-defined crossing potential for the battery.

Further, the medical device industry produces a wide variety of electronic and mechanical devices for treating patient medical conditions. Depending upon the medical condition, medical devices can be surgically implanted or connected externally to the patient receiving treatment. Clinicians use medical devices alone or in combination with drug therapies and surgery to treat patient medical conditions. For some medical conditions, medical devices provide the best, and sometimes the only, therapy to restore an individual to a more healthful condition and a fuller life.

It may be desirable to provide a source of battery power for such medical devices, including implantable medical devices. In such cases, it may be advantageous to provide a battery that may be recharged. It may also be advantageous to provide a battery that may be discharged to a near zero voltage condition without substantial risk that the battery may be damaged (e.g., without corroding one of the electrodes or the battery case, decomposing the positive active material, etc.) such that performance of the battery is not degraded in subsequent charging and discharging conditions.

SUMMARY

A lithium-ion battery includes a case, an electrolyte, a positive electrode, a negative electrode, and an auxiliary electrode. The positive electrode includes a current collector and an active material. The negative electrode includes a current collector and an active material. The auxiliary electrode includes an active material. The electrolyte, positive electrode, negative electrode, and auxiliary electrode are disposed within the case. The auxiliary electrode is configured to selectively couple to the negative electrode to irreversibly absorb lithium from the negative electrode.

A method for producing a lithium-ion battery includes providing a lithium-ion battery having a case with a positive electrode, a negative electrode, an auxiliary electrode, and an electrolyte provided therein. The method further includes configuring the auxiliary electrode to be selectively coupled to the negative electrode to irreversibly absorb lithium from the negative electrode.

A lithium-ion battery includes a positive electrode, a negative electrode, and an auxiliary electrode. The auxiliary electrode includes a material configured to irreversibly absorb lithium from the negative electrode when the auxiliary electrode is selectively coupled to the negative electrode. The auxiliary electrode is configured to lessen the amount of lithium that can be released from the negative electrode during operation of the battery.

DETAILED DESCRIPTION

An improved rechargeable lithium-ion battery or cell has been developed that utilizes an auxiliary electrode to create irreversible capacity to provide a reliable crossing potential for the battery. According to one exemplary embodiment, a lithium ion battery utilizes an auxiliary electrode to provide a reliable positive crossing potential for the battery. The lithium-ion battery includes positive and negative electrodes, each having current collectors and active materials chosen according to desired voltage and stability characteristics. The auxiliary electrode includes an active material that behaves as a lithium sink. After charging the lithium-ion battery, the auxiliary electrode is selectively coupled to the negative electrode to partially deplete the negative electrode of lithium, thereby creating irreversible capacity in the negative electrode by lessening the amount of lithium that can be released from the negative electrode. During a subsequent discharge, the negative electrode will be fully depleted of lithium before the positive electrode can be fully saturated, and, thus, the potential of the negative electrode will cross to the potential of the positive electrode. Thereby, a reliable and predictable positive crossing potential is achieved.

Although the auxiliary electrode discussed herein may be applicable to batteries having a variety of configurations and chemistries, for simplicity the process will be described with respect to the batteries as described in detail below.

Figure 1:
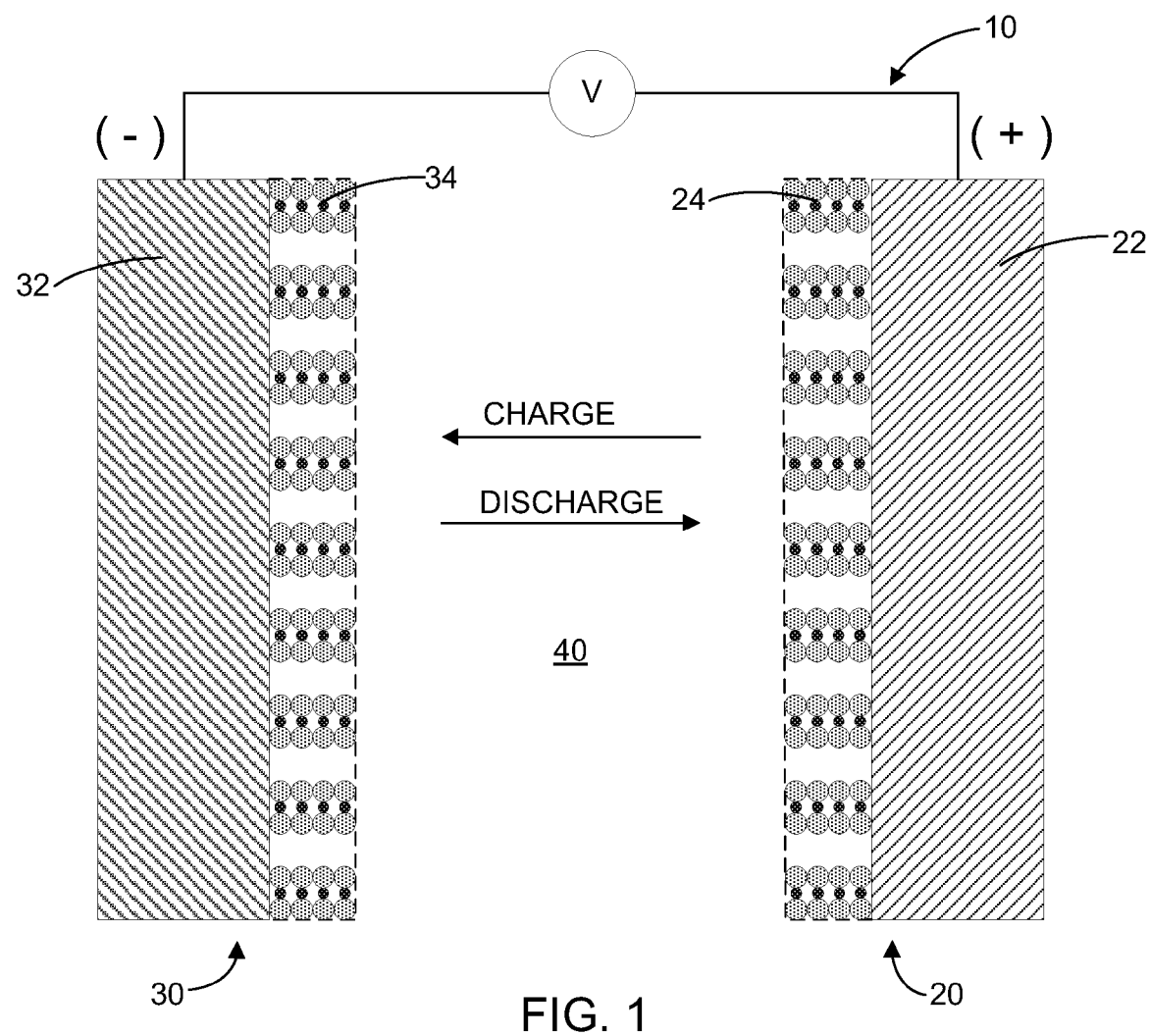
FIG. 1 is a schematic cross-sectional view of a lithium-ion battery.
Figure 2:
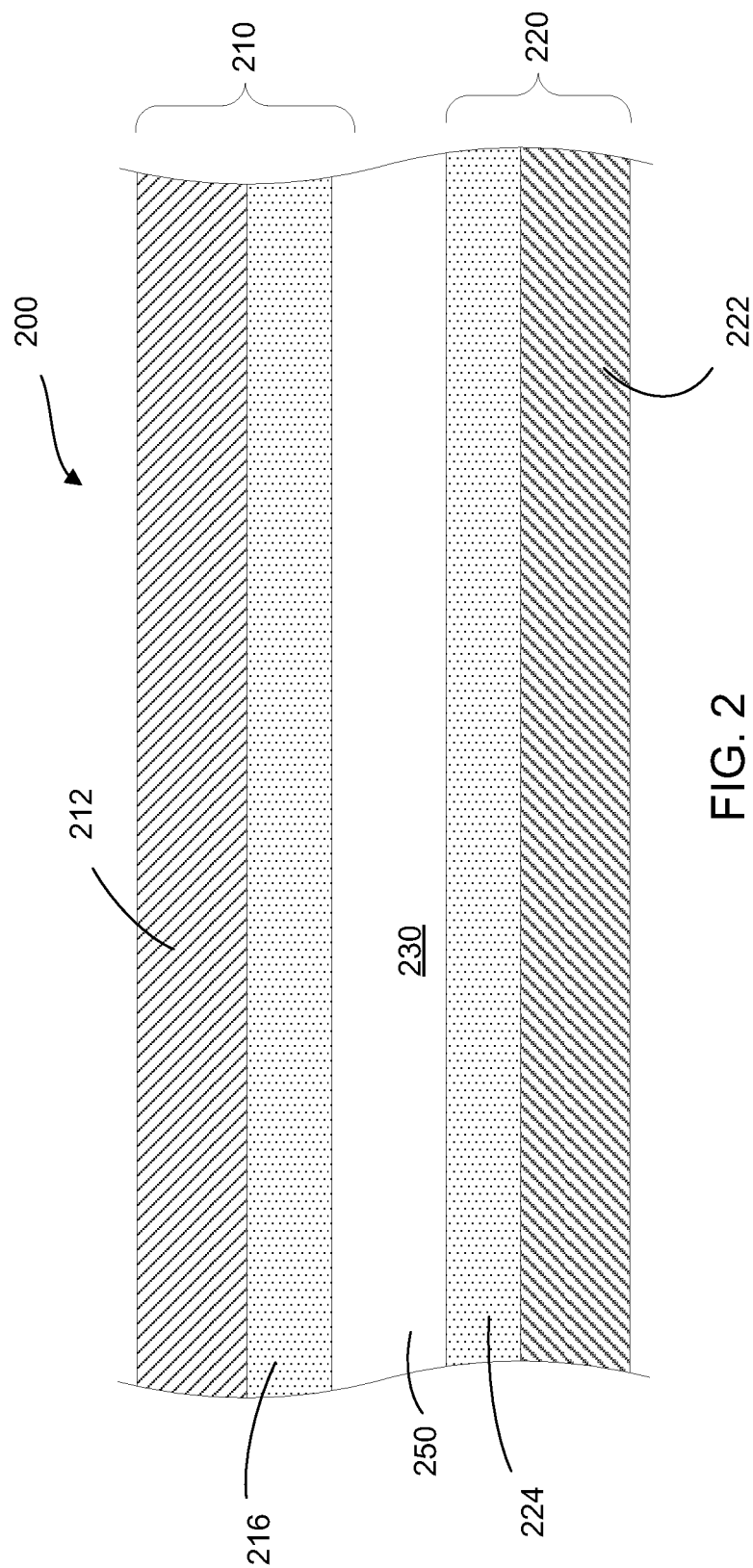
FIG. 2 is a schematic cross-sectional view of a portion of a lithium-ion battery according to an exemplary embodiment.

FIG. 2 is a schematic cross-sectional view of a portion of a battery 200 according to an exemplary embodiment that includes at least one positive electrode 210 and at least one negative electrode 220. The size, shape, and configuration of the battery may be selected based on the desired application or other considerations. For example, the electrodes may be flat plate electrodes, wound electrodes, or folded electrodes (e.g., Z-fold electrodes). According to other exemplary embodiments, the battery may be a button cell battery, a thin film solid state battery, or another type of lithium-ion battery.

According to an exemplary embodiment, the battery 200 has a rating of between approximately 1 and 1000 milliampere hours (mAh). According to another exemplary embodiment, the battery ha a rating of between approximately 100 and 400 mAh. According to another exemplary embodiment, the battery is an approximately 300 mAh battery. According to another exemplary embodiment, the battery is an approximately 75 mAh battery. According to another exemplary embodiment, the battery is an approximately 10 mAh battery.

The battery case or housing (not shown) is formed of a metal or metal alloy such as aluminum or alloys thereof, titanium or alloys thereof, stainless steel, or other suitable materials. According to another exemplary embodiment, the battery case may be made of a plastic material or a plastic-foil laminate material (e.g., an aluminum foil provided intermediate a polyolefin layer and a polyester layer). According to one exemplary embodiment, the case is neutral (i.e., electrically isolated from both the positive and negative electrodes). According to another exemplary embodiment, the case is electrically coupled to one of the positive or negative electrodes and may function as a terminal for the electrode to which the case is coupled.

An electrolyte is provided intermediate or between the positive and negative electrodes to provide a medium through which lithium ions may travel. The electrolyte may be a liquid (e.g., a lithium salt dissolved in one or more non-aqueous solvents). According to an exemplary embodiment, the electrolyte may be a mixture of ethylene carbonate (EC), ethylmethyl carbonate (EMC) and a 1.0 M salt of $LiPF_6$. According to another exemplary embodiment, an electrolyte may be used that uses constituents that may commonly be used in lithium batteries (e.g., propylene carbonate, dimethyl carbonate, vinylene carbonate, lithium bis-oxalatoborate salt (sometimes referred to as LiBOB), etc.).

Various other electrolytes may be used according to other exemplary embodiments. According to an exemplary embodiment, the electrolyte may be a lithium salt dissolved in a polymeric material such as poly(ethylene oxide) or silicone. According to another exemplary embodiment, the electrolyte may be an ionic liquid such as N-methyl-N-alkylpyrrolidinium bis(trifluoromethanesulfonyl)imide salts. According to another exemplary embodiment, the electrolyte may be a 3:7 mixture of ethylene carbonate to ethylmethyl carbonate (EC:EMC) in a 1.0 M salt of $LiPF_6$. According to another exemplary embodiment, the electrolyte may include a polypropylene carbonate solvent and a lithium bis-oxalatoborate salt. According to other exemplary embodiments, the electrolyte may comprise one or more of a PVDF copolymer, a PVDF-polyimide material, and organosilicon polymer, a thermal polymerization gel, a radiation cured acrylate, a particulate with polymer gel, an inorganic gel polymer electrolyte, an inorganic gel-polymer electrolyte, a PVDF gel, polyethylene oxide (PEO), a glass ceramic electrolyte, phosphate glasses, lithium conducting glasses, lithium conducting ceramics, and an inorganic ionic liquid gel, among others.

A separator 250 is provided intermediate or between the positive electrode 210 and the negative electrode 220. According to an exemplary embodiment, the separator 250 is a polymeric material such as a polypropylene/polyethelene copolymer or another polyolefin multilayer laminate that includes micropores formed therein to allow electrolyte and lithium ions to flow from one side of the separator to the other. The thickness of the separator 250 is between approximately 10 micrometers ($\mu m$) and 50 $\mu m$ according to an exemplary embodiment. According to a particular exemplary embodiment, the thickness of the separator is approximately 25 $\mu m$ and the average pore size of the separator is between approximately 0.02 $\mu m$ and 0.1 $\mu m$.

The positive electrode 210 includes a positive current collector 212 having a positive active layer 216 disposed on one or both sides of the current collector 212. The negative electrode 220 includes a negative current collector 222 and a negative active layer 224 disposed on one or both sides of the negative current collector 212. The materials for the positive and negative current collectors 212, 222 and positive and negative active layers 214, 224 may be selected according to various characteristics.

According to one exemplary embodiment, materials for the positive and negative active layers 214, 224 may be chosen based at least in part on their potential versus $Li/Li^+$, which determine the normal operating voltage of the lithium-ion battery (i.e., the voltage of the lithium-ion battery equals the difference in potential between the positive and negative electrodes 210, 220 at any given point of time). Materials for the positive and negative active layers 214, 224 may also be chosen according to their stability, such as their decomposition potential. For example, where a positive crossing potential is desired, the negative active layer may be stable at the average potential versus $Li/Li^+$ of the positive active layer.

According to one exemplary embodiment, materials for the positive and negative current collectors 212, 222 may be chosen based at least in part on their stability, such as their corrosion potential. For example, where a positive crossing potential is desired, the negative current collector may be stable at or above the average potential versus $Li/Li^+$ of the positive active layer.

The positive current collector 212, according to one exemplary embodiment, includes aluminum, which corrodes at a potential below approximately 0.3 volts. According to other exemplary embodiments, the current collector may comprise an aluminum alloy, titanium or titanium alloy (corrosion potential above approximately 4.2 volts), or any combination thereof. Those skilled in the art will recognize that the positive current collector may include various other materials, alone or in combination with those described previously.

According to an exemplary embodiment, the thickness of the current collector 212 is between approximately 5 $\mu m$ and 75 $\mu m$. According to a particular exemplary embodiment, the thickness of the current collector 212 is approximately 20 $\mu m$. It should also be noted that while the positive current collector 212 has been illustrated and described as being a thin foil material, the positive current collector may have any of a variety of other configurations according to various exemplary embodiments. For example, the positive current collector may be a grid such as a mesh grid, an expanded metal grid, a photochemically etched grid, or the like.

The positive active layer 216, according to an exemplary embodiment, includes a material or compound that includes lithium. The lithium included in the positive active layer 216 may be doped and undoped during discharging and charging of the battery, respectively. According to one exemplary embodiment, the active material 216 is lithium cobalt oxide ($LiCoO_2$), which has an average potential of approximately 3.8 volts versus $Li/Li^+$ and decomposes below approximately 1.8 volts.

According to other exemplary embodiments, the positive active layer 216 may include one or more of the materials described above alone or in combination with other materials. For example, the positive active material may include $LiMn_2O_4$ or a material having the formula $LiCo_xNi_{(1-x)}O_2$, where x is between approximately 0.05 and 0.8. According to another exemplary embodiment, the positive active material may include a material of the form $LiNi_xCo_yMn_{(1-x-y)}O_2$, where X is between approximately 0.1 and 0.9 and y is between 0.1 and 0.9 (e.g., $LiNi_{1/3}Co_{1/3}Mn_{1/3}O_2$). According to another exemplary embodiment, the active material 216 may include a material of a metal-doped variety of one of the aforementioned materials, such as a material of the form $LiM_xCo_yNi_{(1-x-y)}O_2$, where M is aluminum or titanium or magnesium and x is between approximately 0.05 and 0.3 and y is between approximately 0.1 and 0.3.

For certain applications, it may be desirable to provide a battery having a cell voltage of greater than approximately 3 volts. In such cases, a higher-voltage active material may be utilized on the positive current collector, such as a material in the form $Li_{2-x}Co_yFe_zMn_{4-(y+z)}O_8$, where X is between approximately 0 and 1 and y is between 0 and 1 and z is between 0 and 1 (e.g., $Li_2Co_{0.4}Fe_{0.4}Mn_{3.2}O_8$). It is believed that such an active material may charge up to 5.2 volts versus a lithium reference electrode, making it possible to obtain an overall cell voltage of up to approximately 3.7 volts or higher depending on the average potential versus $Li/Li^+$ of the negative active material. Other relatively high-voltage active materials that may be used for the positive electrode include $LiCoPO_4$; $LiNiPO_4$; $Li_2CoPO_4F$; $Li[Ni_{0.2}Li_{0.2}Mn_{0.6}]O_2$; and $LiCo_xMn_{2-x}O_4$ (e.g., $LiCo_{0.3}Mn_{1.7}O_4$).

According to various other exemplary embodiments, the active material may include a material such as a material of the form $Li_{1-x}MO_2$ where M is a metal (e.g., $LiCoO_2$, $LiNiO_2$, and $LiMnO_2$), a material of the form $Li_{1-w}(M'_xM''_y)O_2$ where M' and M'' are different metals (e.g., $Li(Cr_xMn_{1-x})O_2$, $Li(Al_xMn_{1-x})O_2$, $Li(Co_xM_{1-x})O_2$ where M is a metal, $Li(Co_xNi_{1-x})O_2$, and $Li(Co_xFe_{1-x})O_2$)), a material of the form $Li_{1-w}(Mn_xNi_yCo_z)O_2$ (e.g., $Li(Mn_{1/3}Ni_{1/3}Co_{1/3})O_2$, $Li(Mn_{1/3}Ni_{1/3}Co_{1/3-x}Mg_x)O_2$, $Li(Mn_{0.4}Ni_{0.4}Co_{0.2})O_2$, and $Li(Mn_{0.1}Ni_{0.1}Co_{0.8})O_2$), a material of the form $Li_{1-w}(Mn_xNi_xCo_{1-2x})O_2$, a material of the form $Li_{1-w}(Mn_xNi_yCo_zAl_w)O_2$, a material of the form $Li_{1-w}(Ni_xCo_yAl_z)O_2$ (e.g., Li(Ni$_{0.8}$Co$_{0.15}$Al$_{0.05}$)O$_2$), a material of the form Li$_{1-w}$(Ni$_x$Co$_y$M$_z$)O$_2$ where M is a metal, a material of the form Li$_{1-w}$(Ni$_x$Mn$_y$M$_z$)O$_2$ where M is a metal, a material of the form Li(Ni$_{x-y}$Mn$_y$Cr$_{2-x}$)O$_4$, LiMn$_2$O$_4$, a material of the form LiM'M''$_2$O$_4$ where M' and M'' are different metals (e.g., LiMn$_{2-y-z}$Ni$_y$O$_4$, Li$_z$O$_4$, LiNiCuO$_4$, LiMn$_{1-x}$Al$_x$O$_4$, LiNi$_{0.5}$Ti$_{0.5}$O$_4$, and Li$_{1.05}$Al$_{0.1}$Mn$_{1.85}$O$_{4-z}$F$_z$), Li$_2$MnO$_3$, a material of the form Li$_x$V$_y$O$_z$ (e.g., LiV$_3$O$_8$, LiV$_2$O$_5$, and LiV$_6$O$_{13}$), a material of the form LiMPO$_4$ where M is a metal or LiM$_x$'M''$_{1-x}$PO$_4$ where M' and M'' are different metals (e.g., LiFePO$_4$, LiFe$_x$M$_{1-x}$PO$_4$ where M is a metal, LiVOPO$_4$, and Li$_3$V$_2$(PO$_4$)$_3$, and LiMPO$_{4x}$ where M is a metal such as iron or vanadium and X is a halogen such as fluorine, and combinations thereof. Those skilled in the art will recognize that the positive active material may include various other materials, alone or in combination with those described previously.

A binder material may also be utilized in conjunction with the layer of active material 216 to bond or hold the various electrode components together. For example, according to an exemplary embodiment, the layer of active material may include a conductive additive such as carbon black and a binder such as polyvinylidine fluoride (PVDF) or an elastomeric polymer.

According to an exemplary embodiment, the thickness of the layer of active material 216 is between approximately 0.1 µm and 3 mm. According to another exemplary embodiment, the thickness of the layer of active material 216 is between approximately µm and 300 µm. According to a particular exemplary embodiment, the thickness of the layer of active material 216 is approximately 75 µm.

The negative current collector 222, according to one exemplary embodiment, comprises aluminum, which corrodes below approximately 0.3 volts. According to another exemplary embodiment, the negative current collector 222 comprises copper (corrodes above approximately 3.5 volts), titanium or titanium alloy (corrodes above approximately 4.2 volts), vanadium, or any combination thereof (corrodes above approximately 3 volts). Those skilled in the art will recognize that the negative current collector may include various other materials, alone or in combination with those described previously.

The negative active layer 224, according to one exemplary embodiment, includes a lithium titanate material such as Li$_4$Ti$_5$O$_{12}$ (sometimes referred to as Li$_{1+x}$[Li$_{1/3}$Ti$_{5/3}$]O$_4$, with 0≤x<1), which has an average potential of approximately 1.55 volts versus Li/Li$^+$. According to another exemplary embodiment, the negative active layer 224 includes graphite (average potential of 0.1 volts versus Li/Li$^+$, with its SEI decomposition above 3.0 volts), or Si alloy (average potential of 0.2 volts versus Li/Li$^+$, with its SEI decomposition above 3.0 volts).

According to one exemplary embodiment, the negative active layer 224 includes a negative active material that is selected to have an average potential that is greater or equal to approximately 0.2 V versus Li/Li$^+$ (e.g., according to one particular exemplary embodiment, the negative active material has an average potential that is greater or equal to approximately 0.3 V versus Li/Li$^+$). According to another exemplary, the negative active material is a titanate material having an average potential that is greater or equal to approximately 1.55 V versus Li/Li$^+$.

According to other exemplary embodiments, the negative active layer 224 may include other lithium titanate materials, including one or more of the following lithium titanate spinel materials: H$_x$Li$_{0.8-x}$TiO$_{2.4}$, (where x=0.0-0.8), Li$_4$M$_x$Ti$_{5-x}$O$_{12}$, Li$_x$Ti$_y$O$_4$, Li$_x$Ti$_y$O$_4$, Li$_4$[Ti$_{1.67}$Li$_{0.33-y}$M$_y$]O$_4$, Li$_2$TiO$_3$, Li$_4$Ti$_{4.75}$V$_{0.25}$O$_{12}$, Li$_4$Ti$_{4.75}$Fe$_{0.25}$O$_{11.88}$, Li$_4$Ti$_{4.5}$Mn$_{0.5}$O$_{12}$, and LiM'M''XO$_4$ (where M' is a metal such as nickel, cobalt, iron, manganese, vanadium, copper, chromium, molybdenum, niobium, or combinations thereof, M'' is an optional three valent non-transition metal, and X is zirconium, titanium, or a combination of these two). Note that such lithium titanate spinel materials may be used in any state of lithiation (e.g., Li$_{4+x}$Ti$_5$O$_{12}$, where 0≤x≤3).

According to an exemplary embodiment, the lithium titanate may be provided such that at least five percent is in the form of lithium titanate nanoparticles (e.g., having a particle size of less than approximately 500 nanometers). The use of such nonoparticles is intended to provide greater surface area for doping and undoping of lithium ions.

According to other exemplary embodiments, a lithium vanadate (e.g., Li$_{1.1}$V$_{0.9}$O$_2$) material may be used as the negative active material. Other materials having cycling potentials that exceed that of lithium by several hundred millivolts and which may be suitable for use as the negative active material include the materials listed in Table 1. Such materials may be used alone or in combination with the lithium titanates described above and/or any of the other materials listed in Table 1.

TABLE 1

Negative Active Materials

| Class | Compound | Approximate Cycling Potentials (vs Li) | | |
|---|---|---|---|---|
| | | Vmin | Vmax | Vavg |
| Oxides | TiO$_2$ (Anatase) | 1.4 | 2 | 1.80 |
| Oxides | WO$_2$ | 0.6 | 1.3 | 0.80 |
| Oxides | WO$_3$ | 0.5 | 2.6 | 1.0 |
| Oxides | MoO$_2$ | 1.3 | 2 | 1.60 |
| Oxides | Nb$_2$O$_5$ | 1.0 | 2 | 1.50 |
| Oxides | LiWO$_2$ | | | 0.75 |
| Oxides | LiMoO$_2$ | 0.8 | 2 | 1.60 |
| Oxides | V$_6$O$_{13}$ | | | 2.30 |
| Oxides | Li$_6$Fe$_2$O$_3$ | | | 0.75 |
| Oxides | LiFeO$_2$ | 1.0 | 3.0 | 2.0 |
| Oxides | Fe$_2$O$_3$ | 0.2 | 2.0 | 0.75 |
| Oxides | MO where M = Co, Ni, Cu or Fe | | | 0.8-1.5 |
| Sulfides | FeS$_2$ | 1.3 | 1.9 | 1.65 |
| Sulfides | MoS$_2$ | | | 1.75 |
| Sulfides | TiS$_2$ | | | 2.00 |
| Alloys | Sn—Bi | | | 0.75 |
| Alloys | Alloys comprising of Al, Si or Sn and other elements | | | 0.30 |
| Alloys | Sn—Co—C | | | 0.30 |
| Alloys | Sb | | | 0.90 |
| Alloys | NbSe$_3$ | | | 1.95 |
| Alloys | Bi | | | 0.80 |
| Alloys | In | | | 0.60 |
| Alloys | Sn—Sb | | | 0.0-1.0 |
| Alloys | Si | | | 0.3 |
| Alloys | Si—C | | | 0.3 |
| Polymers | Poly(phenylquinoline) | | | 1.50 |
| Polymers | Polyparaphenylene | | | 0.70 |
| Polymers | Polyacetylene | | | 1.00 |
| Vanadates | Li$_x$MVO$_4$ where M = Ni, Co, Cd, Zn | | | 0.5-2.0 |

A binder material may also be utilized in conjunction with the layer of active material 224. For example, according to an exemplary embodiment, the layer of active material may include a binder such as polyvinylidine fluoride (PVDF) or an elastomeric polymer. The active material 224 may also include a conductive material such as carbon (e.g., carbon black) at weight loadings of between zero and ten percent to provide increased electronic conductivity.

According to various exemplary embodiments, the thickness of the active material 224 is between approximately 0.1 μm and 3 mm. According to other exemplary embodiments, the thickness of the active material 224 may be between approximately 25 μm and 300 μm. According to another exemplary embodiment, the thickness of the active material 224 may be between approximately 20 μm and 90 μm, and according to a particular exemplary embodiment, approximately 75 μm.

Figure 3:
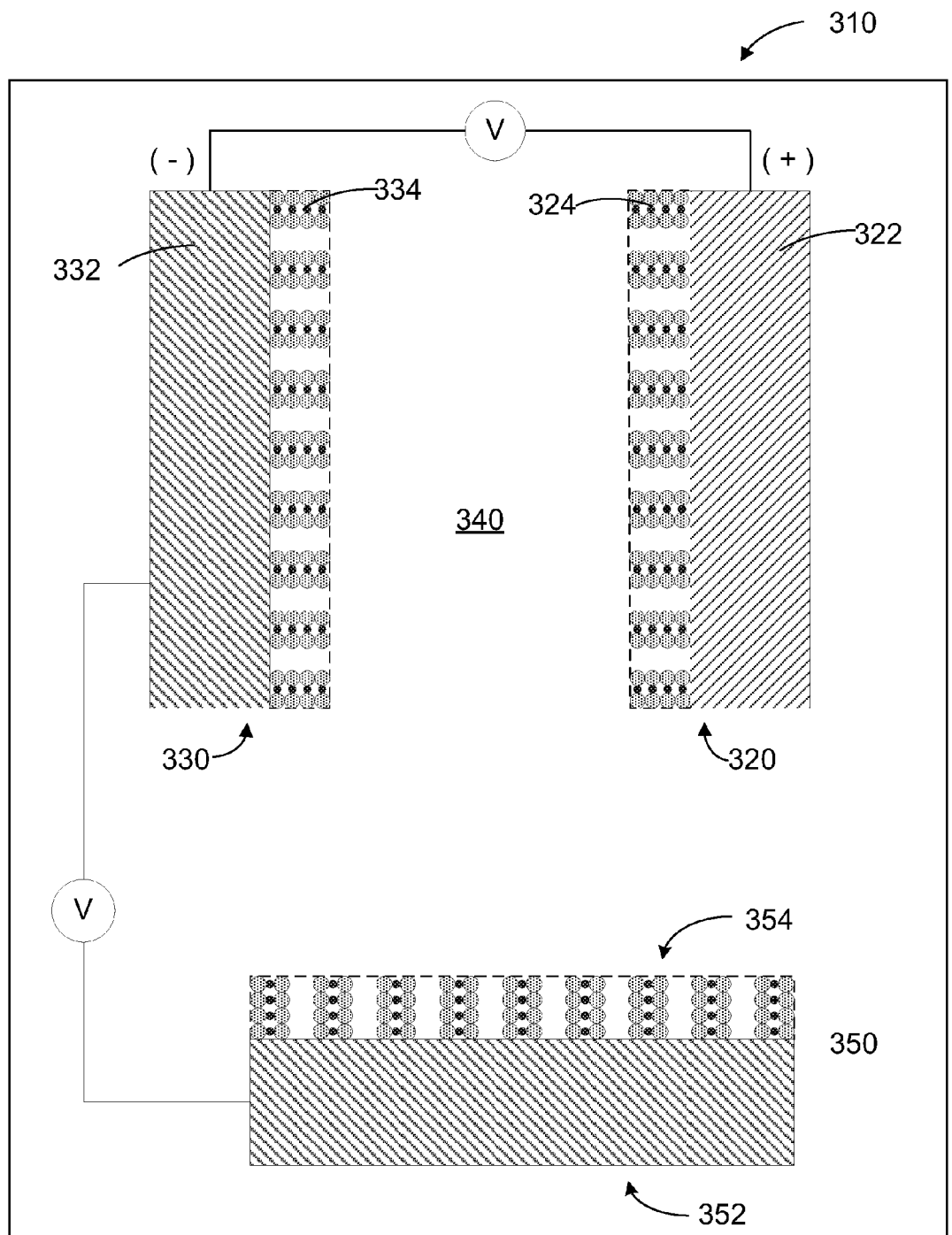
FIG. 3 is a schematic cross-sectional view of a lithium-ion battery including an auxiliary electrode according to an exemplary embodiment including an auxiliary electrode.

Referring now to FIG. 3, according to an exemplary embodiment, a battery is provided with an auxiliary electrode in addition to positive and negative electrodes. In FIG. 3, a schematic of a battery 310 is shown. The battery 310 generally includes a positive electrode 320, negative electrode 330, and an auxiliary electrode 350 disposed within a case 360. The positive electrode includes a current collector 322 and an active layer 324. The negative electrode includes a current collector 332 and an active layer 334. The positive electrode 320 and negative electrodes 330 may be configured as described in the preceding paragraphs.

According to an exemplary embodiment, the 310 battery also includes an auxiliary electrode. The auxiliary electrode 350 includes a current collector 352 and an active layer 354. The auxiliary electrode 350 is configured to selectively couple to the negative electrode 330 to partially deplete the negative electrode 330 of lithium.

Figure 3A:
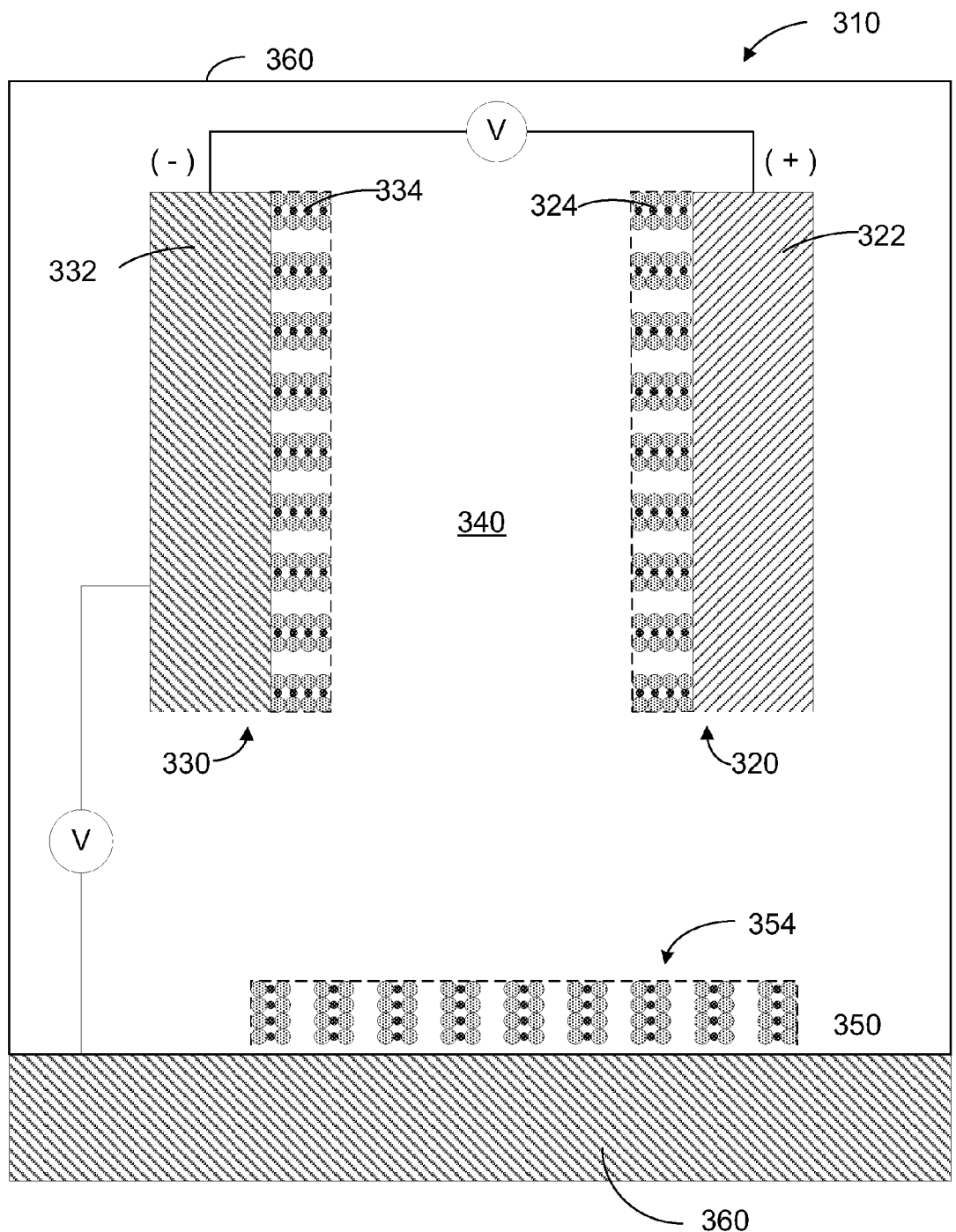
FIG. 3A is a schematic cross-sectional view of a lithium-ion battery including an auxiliary electrode according to an exemplary embodiment including an auxiliary electrode.
Figure 4:
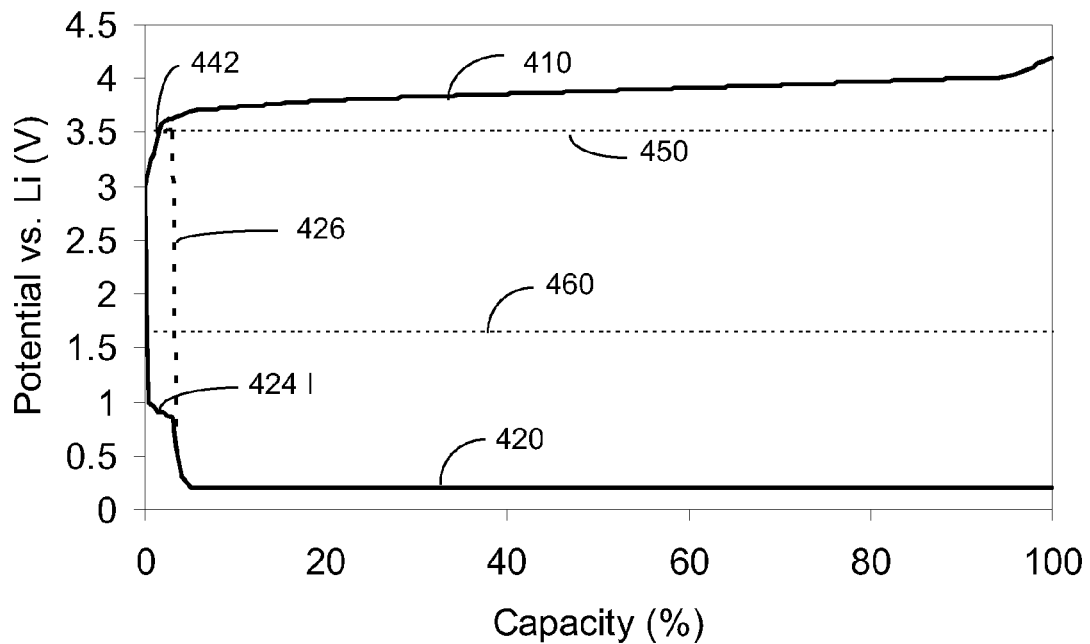
FIG. 4 is a graph illustrating the theoretical potential of the positive and negative electrodes versus a lithium reference electrode for a conventional lithium-ion battery using a carbonaceous negative electrode and no auxiliary electrode.

According to an exemplary embodiment, the auxiliary electrode 350 may be arranged in different manners. According to one exemplary embodiment, the auxiliary electrode 350 is disposed within the case 360. Referring to FIG. 3A, the auxiliary electrode 350 may include a layer of active material 354 disposed on a neutral case 360 (i.e., a case not coupled to either the positive electrode 320 or negative electrode 330, such as configurations where the case 360 may be configured as a terminal), wherein the case 360 functions as the current collector of the auxiliary electrode. The active material may, for example, be disposed on a bottom portion of the case 360 (as shown) or other interior location. According to other exemplary embodiments, the battery 310 may be configured in other manners sufficient to couple the auxiliary electrode to the negative electrode 330, such as with a feed-through.

According to one exemplary embodiment, the auxiliary electrode 350 may be manufactured according to conventional methods known in the art. For example, a slurry and calendering process may be used, wherein a slurry including an active material is deposited onto the current collector of the auxiliary electrode 350, dried, and then calendered (i.e., pressed) to the surface of the current collector 352.

According to an exemplary embodiment, the auxiliary electrode 350 is configured to selectively couple to the negative electrode 330 to irreversibly absorb lithium from the negative electrode 330 into the active layer 354 of the auxiliary electrode 350. The active layer 354 includes an active material with lithium uptake characteristics and an average potential versus $Li/Li^+$ greater than that of the negative active versus $Li/Li^+$. With these characteristics, when coupled, lithium will transfer from the lower potential negative electrode 330 to the auxiliary electrode 350. The negative electrode 330 may be partially depleted of lithium in an irreversible manner to create irreversible capacity in the negative electrode 330.

According to one exemplary embodiment, the auxiliary active material is not a reversible material (i.e., uptakes or reacts with lithium but does not release lithium). According to an exemplary embodiment, the auxiliary active material may be a primary cathode material (i.e., cathode material for non-rechargeable batteries, which may or may not be reversible), such as silver vanadium oxide (SVO), carbon monofluoride $(CF_x)$, silver chromium oxide $(Ag_2CrO_4)$, vanadium pentoxide $(V_2O_5)$, manganese dioxide, copper sulfide (CuS), iron sulfide $(FeS, FeS_2)$, copper oxide, or similar materials, or any stable combination thereof. According to another exemplary embodiment, the auxiliary active material is a reversible material (i.e., has lithium uptake and release capability). For example, the auxiliary active material may be $MoS_2$, $MnO_2$, $TiS_2$, $NbSe_3$, $V_2O_5$, $VO_x$, $CuCl_2$, $Fe_2O_3$, $FeF_3$, $FeF_2$, $NiF_2$, $CoF_2$, similar materials, or any stable combination thereof.

According to an exemplary embodiment, the total lithium capacity of the auxiliary electrode may be chosen, for example, with consideration of the characteristics and uses of the battery. These considerations, also in view of the lithium storage density of the selected auxiliary active material, will dictate the total amount of auxiliary active material required or desired in a particular battery and/or in a particular use. For example, a battery may have a positive electrode with a current collector and active layer with materials that are particularly unstable at the average potential of the negative active layer. In such circumstances, a positive crossing potential may be desirable, and added lithium capacity of the auxiliary electrode 350 could create greater relative irreversible capacity of the negative electrode 330 to better ensure the positive crossing potential. Or, for example, a battery may have a particularly long useful life or be used in applications where battery replacement is difficult (e.g., medical device). In such situations, greater lithium capacity would enable increased ability to create irreversible capacity in the negative electrode 330 to account for more irreversible capacity in the positive electrode 320 and longer ensure a positive crossing potential. More particularly, total lithium capacity of the auxiliary electrode 350 may be chosen according to expected irreversible capacity in the positive electrode or negative electrode after a number of years, charging cycles, deep discharge cycles, usage demands of the batteries, other criteria, or any combination thereof.

According to an exemplary embodiment, the auxiliary electrode 350 is configured to selectively couple to the negative electrode 330 during production of the battery and/or at one or more points during the useful life of the battery.

According to an exemplary embodiment, the auxiliary electrode 350 is coupled to the negative electrode during production of the battery cell. For example, after charging, the battery cell (and, thus, after having already created irreversible capacity in the negative electrode through formation of the SEI layer), the auxiliary electrode is connected to the negative electrode via a galvanostat (a constant current instrument) such that a measured amount of charge is transferred between the negative electrode and auxiliary electrode. A galvanostat monitors the voltage between the negative electrode and the auxiliary electrode and delivers a predetermined current for a predetermined duration. For example, for a cell with a nominal capacity of 100 mAh, if the extra irreversible capacity desired at the negative electrode is 10% or 10 mAh, the galvanostat negative may be set up to deliver 10 mA of current for 1 hour. Lithium is, thus, transferred from the negative electrode to the auxiliary electrode to precisely control irreversible capacity in the negative electrode.

According to another exemplary embodiment, the auxiliary electrode is instead, or additionally, coupled to the negative electrode at one or more points during the useful life of the lithium-ion battery. The battery, or device in which the battery is installed, includes circuitry that couples the auxiliary electrode to the negative electrode, such as a lead and switch controlled, which may be actuated by a controller running software. The device circuitry would be designed to control the amount of charge that is transferred between the negative electrode and the auxiliary electrode. For example, the auxiliary and negative electrodes may be coupled upon occurrence of certain conditions after production, such as after the lithium-ion battery reaches a specified voltage (e.g., approaching zero, below a specified cut-off voltage, or a specified threshold below the normal operating voltage of the battery cell), after a predetermined number of charge/discharge cycles, calendar life, or any combination thereof. According to one exemplary embodiment, the auxiliary electrode is coupled to the negative electrode for a predetermined amount of time. According to another exemplary embodiment, coupling occurs for variable amounts of time based on occurrence of the conditions above. According to one exemplary embodiment, circuitry, including one or more switches and/or diodes, and/or software may be provided to detect occurrence of such conditions and control coupling of the auxiliary electrode and negative electrode. For example, the sensing and control circuitry and/or software may be provided in a device in which the lithium-ion battery is located.

Figure 5:
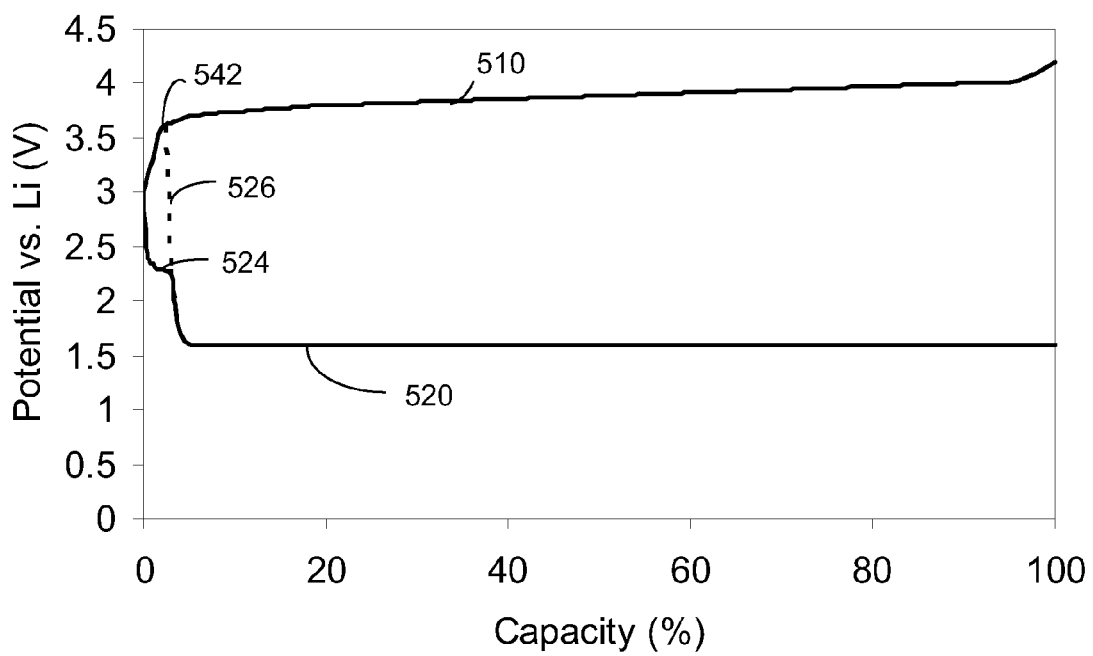
FIG. 5 is a graph illustrating the theoretical potential of the positive and negative electrodes versus a lithium reference electrode for a lithium-ion battery according to one exemplary embodiment.
Figure 6:
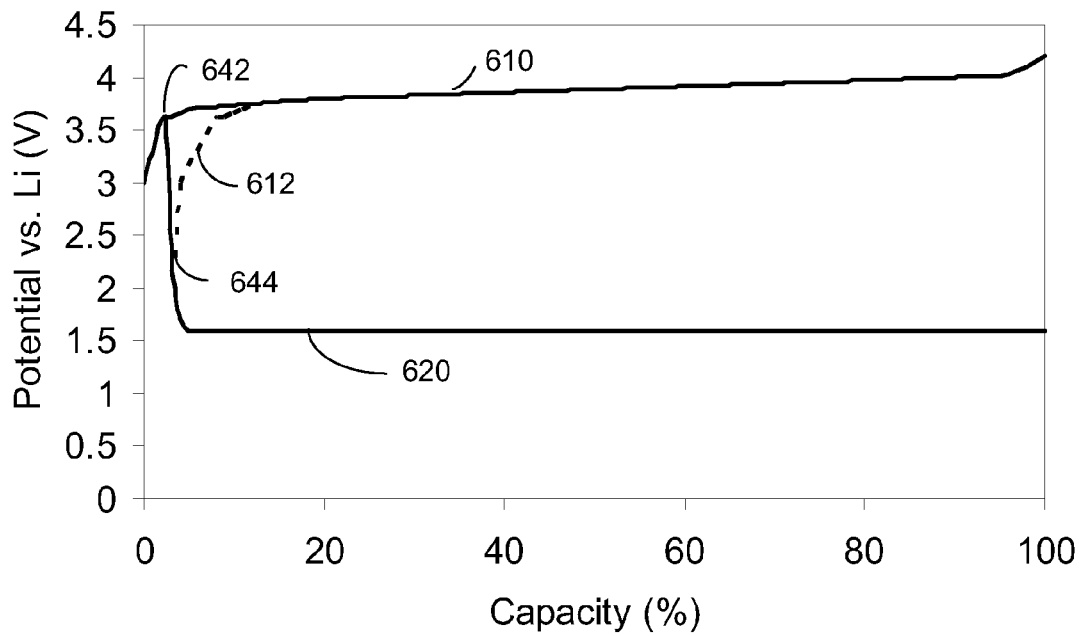
FIG. 6 is a graph illustrating the theoretical potential of the positive and negative electrodes versus a lithium reference electrode for a lithium-ion battery in which the positive electrode has irreversible capacity.
Figure 7:
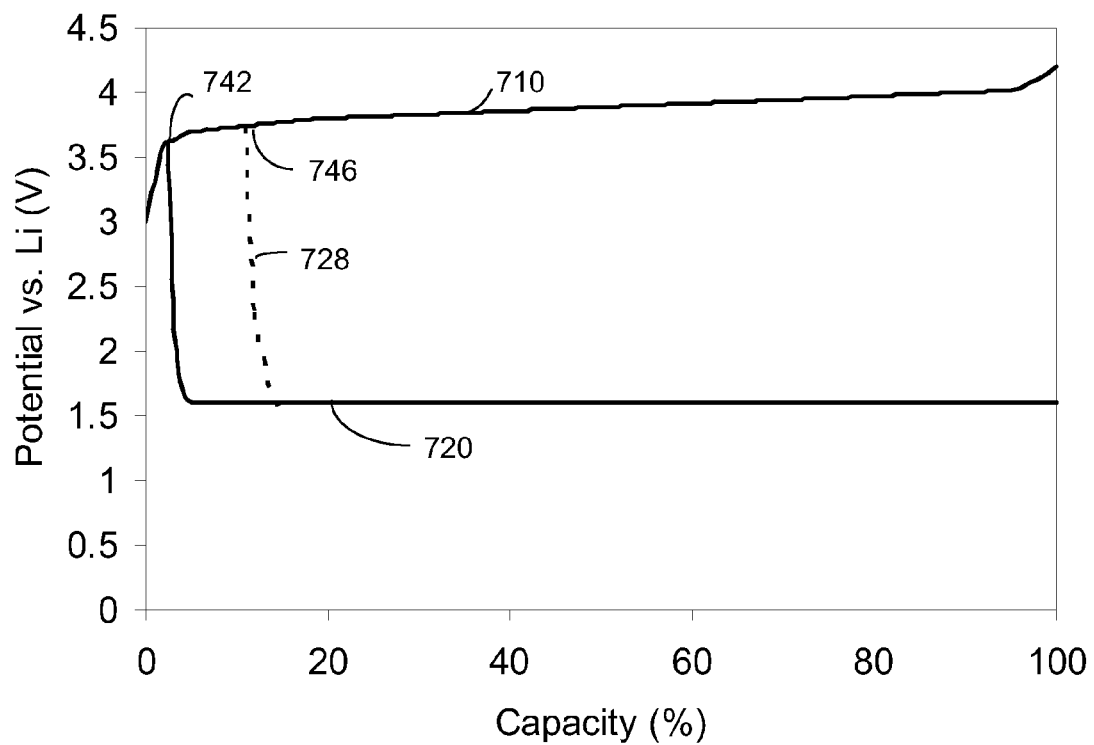
FIG. 7 is a graph illustrating the theoretical potential of the positive and negative electrodes versus a lithium reference electrode for a lithium-ion battery in which the negative electrode has irreversible capacity from being coupled to an auxiliary electrode.

Now referring to FIGS. 5-7, according to one exemplary embodiment, the positive electrode includes an aluminum current collector and $LiCoO_2$ active material. The negative electrode includes an aluminum current collector and a lithium titanate active material. The auxiliary electrode is arranged as in FIG. 3B and includes a $CF_x$ active material disposed on a titanium case. FIGS. 5-7 are theoretical representations of the charge/discharge characteristics of the lithium-ion battery, where FIG. 5 is a fresh (i.e., few charge/discharge cycles), FIG. 6 is an aged battery having experienced irreversible capacity loss in the positive electrode, and FIG. 7 is an aged battery having had additional irreversible capacity created in the negative electrode by coupling to the auxiliary electrode.

Referring now to FIG. 5, during an initial charge of the lithium-ion battery, the lithium-ion battery is charged at a 10 hour rate (C/10) to 2.8V and held at 2.8 volts for 4 hours. The positive electrode potential versus $Li/Li^+$ (represented by solid curve 510) moves rightward along the graph 500, increasing from a starting potential of approximately 3 volts to an average potential of approximately 3.8 volts. The negative electrode potential versus $Li/Li^+$ (represented by solid curve 520) moves rightward along the graph 500, decreasing from approximately 3 volts to an average potential of approximately 1.55 volts. During the initial charge cycle, a passive layer is formed on the negative current collector (i.e., a solid-electrolyte interface or "SEI"), which results in irreversible capacity in the negative electrode. This irreversible capacity is represented by the shelf 524 on curve 520. During subsequent discharges, the positive electrode will follow curve 510 leftward. The negative electrode potential will follow curve 520 leftward and up dashed portion 526 of curve 520. In deep discharge conditions (i.e., where the lithium-ion battery approaches or is at 0 volts), the positive and negative electrode potentials approach each other to yield a crossing potential at point 542.

As the battery ages, however, the irreversible capacities of the positive and/or the negative electrodes may shift, resulting in unreliable crossing potentials. Referring now to the theoretical graph 600 in FIG. 6, for example, the positive electrode may experience irreversible capacity loss. The potential of the positive electrode follows solid curve 610. The positive electrode initially follows the solid portions of curve 610 during charge/discharge cycles, but due to irreversible capacity loss now follows dashed curve 612. Accordingly, the irreversible capacity loss in the positive electrode results in a decrease of the crossing potential from point 642 at approximately 3.6 volts to point 644 at approximately 2.2 volts.

To provide a reliable and predictable crossing potential, despite unpredictable increases of irreversible capacity loss in the positive electrode, irreversible capacity may be intentionally created in the negative electrode. Referring now to the theoretical graph 700 in FIG. 7, the potential during charge/discharge is depicted for a negative electrode having been previously coupled to the auxiliary electrode. Coupling the negative electrode to the auxiliary electrode results in partial depletion of lithium from the negative electrode, thus creating irreversible capacity in the negative electrode. During charge/discharge cycles, the negative electrode potential follows solid line 720 leftward to dashed curve 728 to achieve a positive crossing potential at point 746 of approximately 3.6 volts at the potential of the positive electrode (represented by solid line 710), despite the irreversible capacity loss in the positive electrode. Accordingly, by coupling the negative electrode to the auxiliary electrode, a reliable crossing potential at the positive electrode is achieved despite irreversible capacity loss in the positive electrode.

Figure 10:
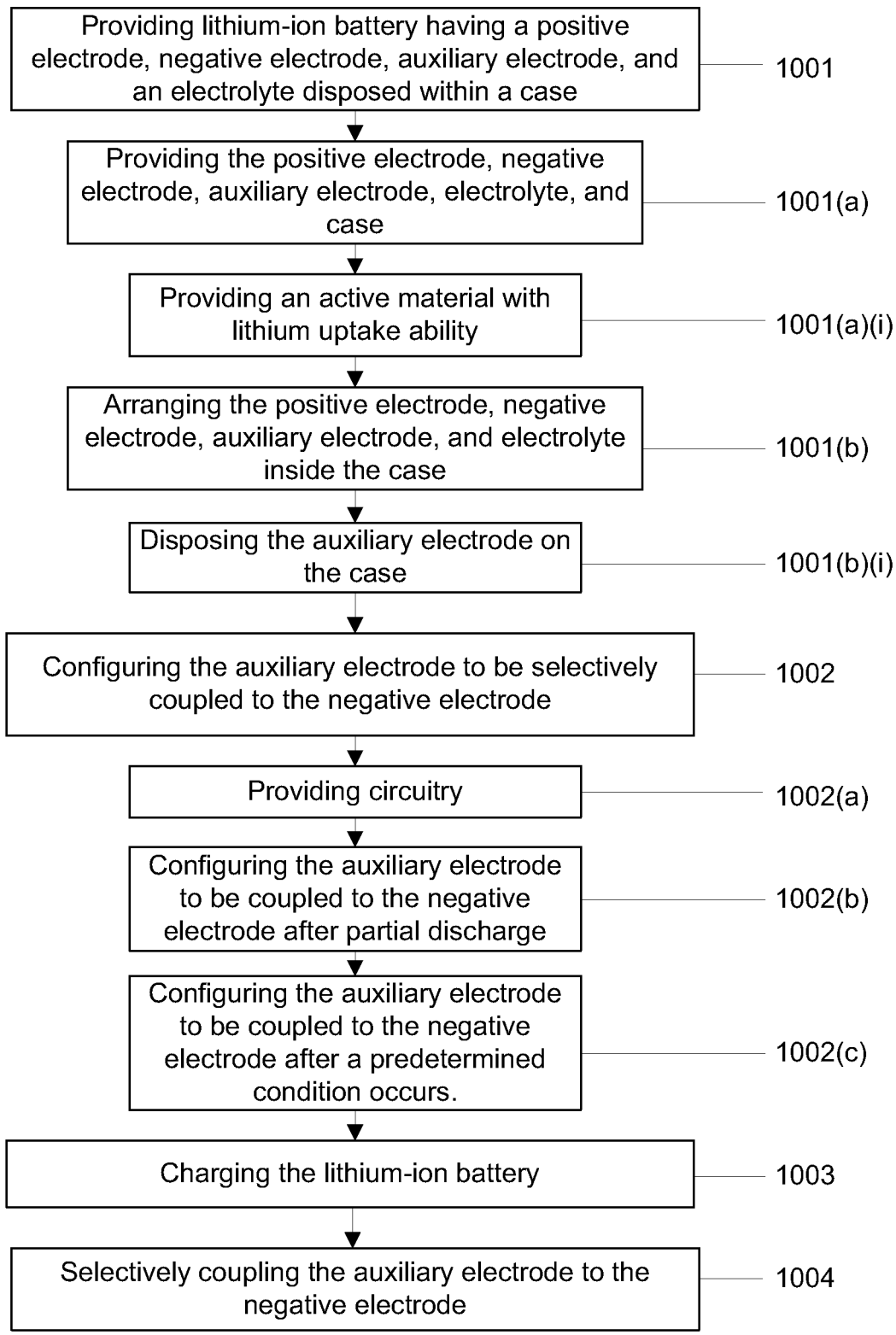
FIG. 10 is a flowchart of a method for producing a battery according to an exemplary embodiment.

Referring now to FIG. 10, a method is provided for producing a lithium-ion battery according to an exemplary embodiment. The method includes: providing lithium-ion battery that includes a positive electrode (e.g., 320 in FIG. 3), a negative electrode (e.g., 330), auxiliary electrode (e.g., 350), and an electrolyte disposed within a case (Step 1001); and, configuring the auxiliary electrode to be selectively coupled to the negative electrode (Step 1002). The method may also include charging the lithium-ion battery (Step 1003), and selectively coupling the auxiliary electrode to the negative electrode (Step 1004).

According to an exemplary embodiment, the step of providing a lithium-ion battery may also include providing the positive electrode, negative electrode, auxiliary electrode, electrolyte, and case (Step 1001(a)). The step of providing the auxiliary electrode may include providing an active material with lithium uptake ability (Step 1001(a)(i)).

According an exemplary embodiment, the step of providing a lithium-ion battery may also include arranging the positive electrode, negative electrode, auxiliary electrode, and electrolyte inside the case (Step 1001(b)). The step of arranging the auxiliary electrode may also include disposing the auxiliary electrode on the case (Step 1001(b)(i)).

According to an exemplary embodiment, the step of configuring the auxiliary electrode to be selectively coupled to the negative electrode may include providing circuitry (Step 1002(a)), configuring the auxiliary electrode to be coupled to the negative electrode after partial discharge (Step 1002(b)), and/or configuring the auxiliary electrode to be coupled to the negative electrode after occurrence of a predetermined condition (Step 1002(c)). A predetermined condition may, for example, include the battery being discharged to a predetermined cut-off voltage a predetermined number of times, the battery being discharged below a predetermined threshold, the battery being deeply discharged, the battery experiencing a predetermined number of charge or discharge cycles, or the battery being in use for a predetermined amount of time.

According to another exemplary embodiment, an auxiliary electrode is coupled to the positive electrode to provide a reliable and predictable negative crossing potential. Materials for the current collectors and active layers of the positive and negative electrodes are selected from those stable at the average potential of the negative electrode. The auxiliary electrode is a lithium source, which is selectively coupled to the positive electrode to irreversibly, partially saturate the positive electrode with lithium, such that the positive electrode will be fully saturated with lithium prior to when the negative electrode can be fully depleted. Accordingly, during deep discharge, the potential of the positive electrode will rapidly approach the potential of the negative electrode, yielding a negative crossing potential.

Figure 8:
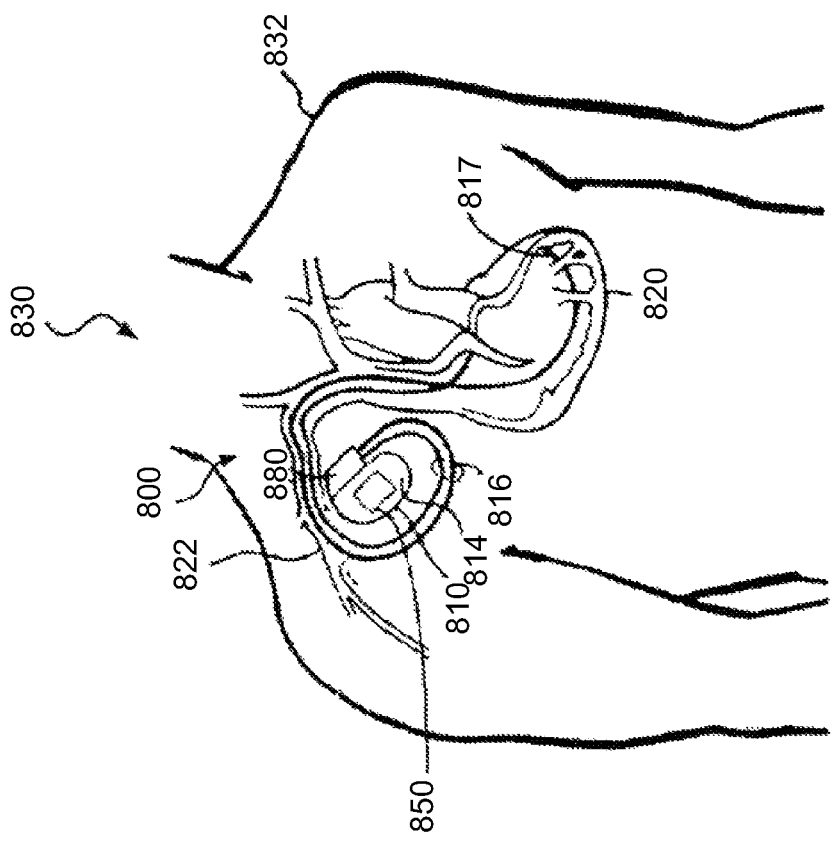
FIG. 8 is a schematic view of a system in the form of an implantable medical device implanted within a body or torso of a patient including a lithium-ion battery according to one exemplary embodiment.

The batteries and formation methods described in the present application may find utility in a variety of applications, including in implantable medical devices (IMDs). FIG. 8 illustrates a schematic view of a system 800 (e.g., an implantable medical device) implanted within a body or torso 832 of a patient 830. The system 800 includes a device 810 in the form of an implantable medical device that for purposes of illustration is shown as a defibrillator configured to provide a therapeutic high voltage (e.g., 700 volt) treatment for the patient 830.

The device 810 includes a container or housing 818 that is hermetically sealed and biologically inert according to an exemplary embodiment. The container may be made of a conductive material. One or more leads 816 electrically connect the device 810 and to the patient's heart 820 via a vein 822. Electrodes 817 are provided to sense cardiac activity and/or provide an electrical potential to the heart 820. At least a portion of the leads 816 (e.g., an end portion of the leads shown as exposed electrodes 817) may be provided adjacent or in contact with one or more of a ventricle and an atrium of the heart 820.

The device 810 includes a battery 880 provided therein to provide power for the device 810. The size and capacity of the battery 880 may be chosen based on a number of factors, including the amount of charge required for a given patient's physical or medical characteristics, the size or configuration of the device, and any of a variety of other factors. According to an exemplary embodiment, the battery is a 5 mAh battery. According to another exemplary embodiment, the battery is a 300 mAh battery. According to various other exemplary embodiments, the battery may have a capacity of between approximately 1 and 1000 mAh.

According to other exemplary embodiments, more than one battery may be provided to power the device 810. In such exemplary embodiments, the batteries may have the same capacity or one or more of the batteries may have a higher or lower capacity than the other battery or batteries. For example, according to an exemplary embodiment, one of the batteries may have a capacity of approximately 500 mAh while another of the batteries may have a capacity of approximately 75 mAh.

According to an exemplary embodiment, the battery may be configured such that it may be charged and recharged using an inductive charging system in which a primary or external coil is provided at an exterior surface of a portion of the body (either proximate or some distance away from the battery) and a secondary or internal coil is provided below the skin adjacent the primary coil.

Figure 9:
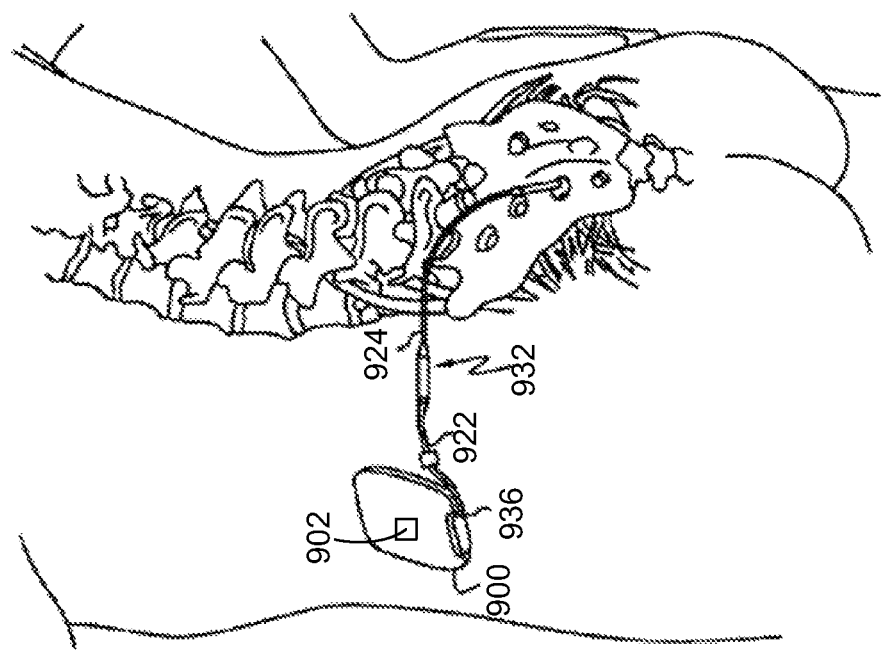
FIG. 9 is a schematic view of another system in the form of an implantable medical device including a lithium-ion battery according to one exemplary embodiment.

According to another exemplary embodiment shown in FIG. 9, an implantable neurological stimulation device 900 (an implantable neuro stimulator or INS) may include a battery 902 such as those described above with respect to the various exemplary embodiments. Examples of some neuro stimulation products and related components are shown and described in a brochure titled "Implantable Neurostimulation Systems" available from Medtronic, Inc.

An INS generates one or more electrical stimulation signals that are used to influence the human nervous system or organs. Electrical contacts carried on the distal end of a lead are placed at the desired stimulation site such as the spine or brain and the proximal end of the lead is connected to the INS. The INS is then surgically implanted into an individual such as into a subcutaneous pocket in the abdomen, pectoral region, or upper buttocks area. A clinician programs the INS with a therapy using a programmer. The therapy configures parameters of the stimulation signal for the specific patient's therapy. An INS can be used to treat conditions such as pain, incontinence, movement disorders such as epilepsy and Parkinson's disease, and sleep apnea. Additional therapies appear promising to treat a variety of physiological, psychological, and emotional conditions. Before an INS is implanted to deliver a therapy, an external screener that replicates some or all of the INS functions is typically connected to the patient to evaluate the efficacy of the proposed therapy.

The INS 900 includes a lead extension 922 and a stimulation lead 924. The stimulation lead 924 is one or more insulated electrical conductors with a connector 932 on the proximal end and electrical contacts (not shown) on the distal end. Some stimulation leads are designed to be inserted into a patient percutaneously, such as the Model 3487A Pisces-Quad® lead available from Medtronic, Inc. of Minneapolis Minn., and stimulation some leads are designed to be surgically implanted, such as the Model 3998 Specify® lead also available from Medtronic.

Although the lead connector 932 can be connected directly to the INS 900 (e.g., at a point 936), typically the lead connector 932 is connected to a lead extension 922. The lead extension 922, such as a Model 7495 available from Medtronic, is then connected to the INS 900.

Implantation of an INS 900 typically begins with implantation of at least one stimulation lead 924, usually while the patient is under a local anesthetic. The stimulation lead 924 can either be percutaneously or surgically implanted. Once the stimulation lead 924 has been implanted and positioned, the stimulation lead's 924 distal end is typically anchored into position to minimize movement of the stimulation lead 924 after implantation. The stimulation lead's 924 proximal end can be configured to connect to a lead extension 922.

The INS 900 is programmed with a therapy and the therapy is often modified to optimize the therapy for the patient (i.e., the INS may be programmed with a plurality of programs or therapies such that an appropriate therapy may be administered in a given situation).

A physician programmer and a patient programmer (not shown) may also be provided to allow a physician or a patient to control the administration of various therapies. A physician programmer, also known as a console programmer, uses telemetry to communicate with the implanted INS 900, so a clinician can program and manage a patient's therapy stored in the INS 900, troubleshoot the patient's INS system, and/or collect data. An example of a physician programmer is a Model 7432 Console Programmer available from Medtronic. A patient programmer also uses telemetry to communicate with the INS 900, so the patient can manage some aspects of her therapy as defined by the clinician. An example of a patient programmer is a Model 7434 Itrel® 3 EZ Patient Programmer available from Medtronic.

According to an exemplary embodiment, a battery provided as part of the INS 900 may be configured such that it may be charged and recharged using an inductive charging system in which a primary or external coil is provided at an exterior surface of a portion of the body (either proximate or some distance away from the battery) and a secondary or internal coil is provided below the skin adjacent the primary coil.

While the medical devices described herein (e.g., systems 800 and 900) are shown and described as a defibrillator and a neurological stimulation device, it should be appreciated that other types of implantable medical devices may be utilized according to other exemplary embodiments, such as pacemakers, cardioverters, cardiac contractility modules, drug administering devices, diagnostic recorders, cochlear implants, and the like for alleviating the adverse effects of various health ailments.

It is also contemplated that the medical devices described herein may be charged or recharged when the medical device is implanted within a patient. That is, according to an exemplary embodiment, there is no need to disconnect or remove the medical device from the patient in order to charge or recharge the medical device.

It is important to note that the construction and arrangement of the batteries and cells and the methods for forming such batteries as shown and described in the various exemplary embodiments is illustrative only. Although only a few embodiments have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to other exemplary embodiments. Other substitutions, modifications, changes, and omissions may be made in the design, operating conditions, and arrangement of the various exemplary embodiments without departing from the scope of the present inventions as expressed in the appended claims.

What is claimed is:

1. A lithium-ion battery comprising:
a case;
an electrolyte;
a positive electrode including a current collector and an active material;
a negative electrode including a current collector and an active material; and
an auxiliary electrode including an active material selected from the group consisting of silver vanadium oxide, carbon monofluoride, and manganese dioxide;
wherein the electrolyte, positive electrode, negative electrode, and auxiliary electrode are disposed within the case; and
wherein the auxiliary electrode is configured to selectively couple to the negative electrode to irreversibly absorb lithium from the negative electrode.

2. The lithium-ion battery according to claim 1, wherein selectively coupling the auxiliary electrode and the negative electrode is configured to provide a crossing potential at the potential of the positive electrode.

3. The lithium-ion battery according to claim 2, wherein materials selected for the current collector and active material of the positive electrode and materials selected for the current collector and active material of the negative electrode are stable at the crossing potential.

4. The lithium-ion battery according to claim 1, wherein the auxiliary electrode has lithium uptake ability.

5. The lithium-ion battery according to claim 1, wherein the auxiliary electrode is coupled to the negative electrode after initial charging of the battery has been completed, and wherein coupling the auxiliary electrode and negative electrode partially depletes the negative electrode of lithium.

6. The lithium-ion battery according to claim 5, wherein the auxiliary electrode is coupled to the negative electrode during production of the lithium-ion battery.

7. The lithium-ion battery according to claim 5, wherein the auxiliary electrode is coupled to the negative electrode after partial discharge of the lithium-ion battery.

8. The lithium-ion battery according to claim 5, wherein the auxiliary electrode is coupled to the negative electrode after at least one of: the battery being discharged to a predetermined cut-off voltage a predetermined number of times, the battery being discharged below a predetermined threshold, the battery being deeply discharged, the battery experiencing a predetermined number of charge or discharge cycles, or the battery being in use for a predetermined amount of time.

9. The lithium-ion battery according to claim 1, wherein the auxiliary electrode selectively coupled to the negative electrode by circuitry.

10. The lithium-ion battery according to claim 9, wherein the circuitry couples the auxiliary electrode to the negative electrode upon detection of a predetermined condition.

11. The lithium-ion battery according to claim 10, wherein the auxiliary electrode includes an active layer disposed on an interior surface of the case.

12. A lithium-ion battery comprising:
a positive electrode;
a negative electrode; and
an auxiliary electrode comprising an auxiliary active material selected from the group consisting of silver vanadium oxide, carbon monofluoride, and manganese dioxide, the auxiliary electrode being configured to irreversibly absorb lithium from the negative electrode when the auxiliary electrode is selectively coupled to the negative electrode, and the auxiliary active material being an irreversible material;
whereby the auxiliary electrode is configured to lessen the amount of lithium that can be released from the negative electrode during operation of the battery.

13. The lithium-ion battery of claim 12, the auxiliary electrode is configured to irreversibly absorb an amount of lithium to provide a crossing potential at the potential of the positive electrode.

14. The lithium-ion battery of claim 12, wherein the auxiliary electrode is selectively coupled to the negative electrode during production of the lithium-ion battery.

15. The lithium-ion battery of claim 12, wherein the auxiliary electrode is configured to couple to the negative electrode after the lithium-ion battery has been initially charged.

16. The lithium-ion battery of claim 12 further comprising circuitry configured to selectively couple the auxiliary electrode to the negative electrode upon occurrence of a predetermined condition.

17. The lithium-ion battery of claim 12 further comprising a case, wherein the positive electrode, negative electrode, and auxiliary electrode are disposed inside the case.

18. The lithium-ion battery of claim 17, wherein the auxiliary electrode is disposed on an interior surface of the case.

* * * * *